United States Patent [19]
Barnett et al.

[11] Patent Number: 5,870,317
[45] Date of Patent: Feb. 9, 1999

[54] REMOTE AND PROXIMAL INTERLOCK TESTING MECHANISMS AND TESTING SYSTEMS

[76] Inventors: Ralph L. Barnett, 2721 Alison La., Wilmette, Ill. 60091; Theodore Liber, 597 Ridge Rd., Highland Park, Ill. 60035

[21] Appl. No.: 861,328

[22] Filed: May 21, 1997

[51] Int. Cl.⁶ .................................................. G06F 11/22
[52] U.S. Cl. ........................ 364/578; 307/115; 307/116; 364/207.26
[58] Field of Search ............................ 200/50.01, 50.1, 200/334; 364/578, 184; 702/182, 183; 324/207; 307/115, 116, 246, 326

[56] References Cited

U.S. PATENT DOCUMENTS 5,281,857  1/1994  Keese ........................................ 307/115
5,648,719  7/1997  Christensen et al. .............. 324/207.26

*Primary Examiner*—Kevin J. Teska
*Assistant Examiner*—Lonnie A. Knox
*Attorney, Agent, or Firm*—Jack Shore

[57] ABSTRACT

This invention relates to a novel process with attendant methods and apparatus for testing interlocks on machine barrier guards or equivalent safeguards. The process simulates the breaching of the interlocked safeguard to test the interlock without shutting down the machine operation. Failed interlocks are identified and their status warned against. Furthermore, the associated barrier guards may be physically locked to prevent access to their protected space while allowing normal machine operations until maintenance is practical. The testing process makes possible the reliable interlocking of fixed guards and may be automated to prevent bypassing or sabotage of interlocked safeguarding systems.

66 Claims, 20 Drawing Sheets

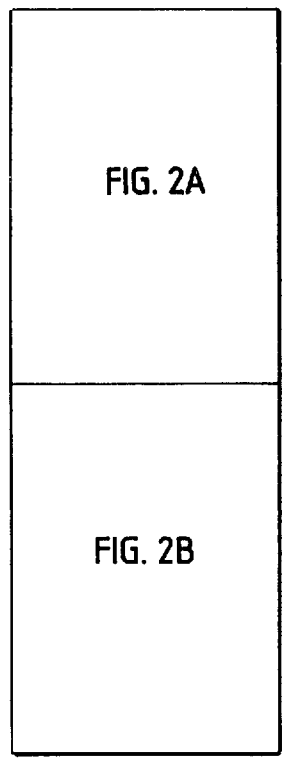

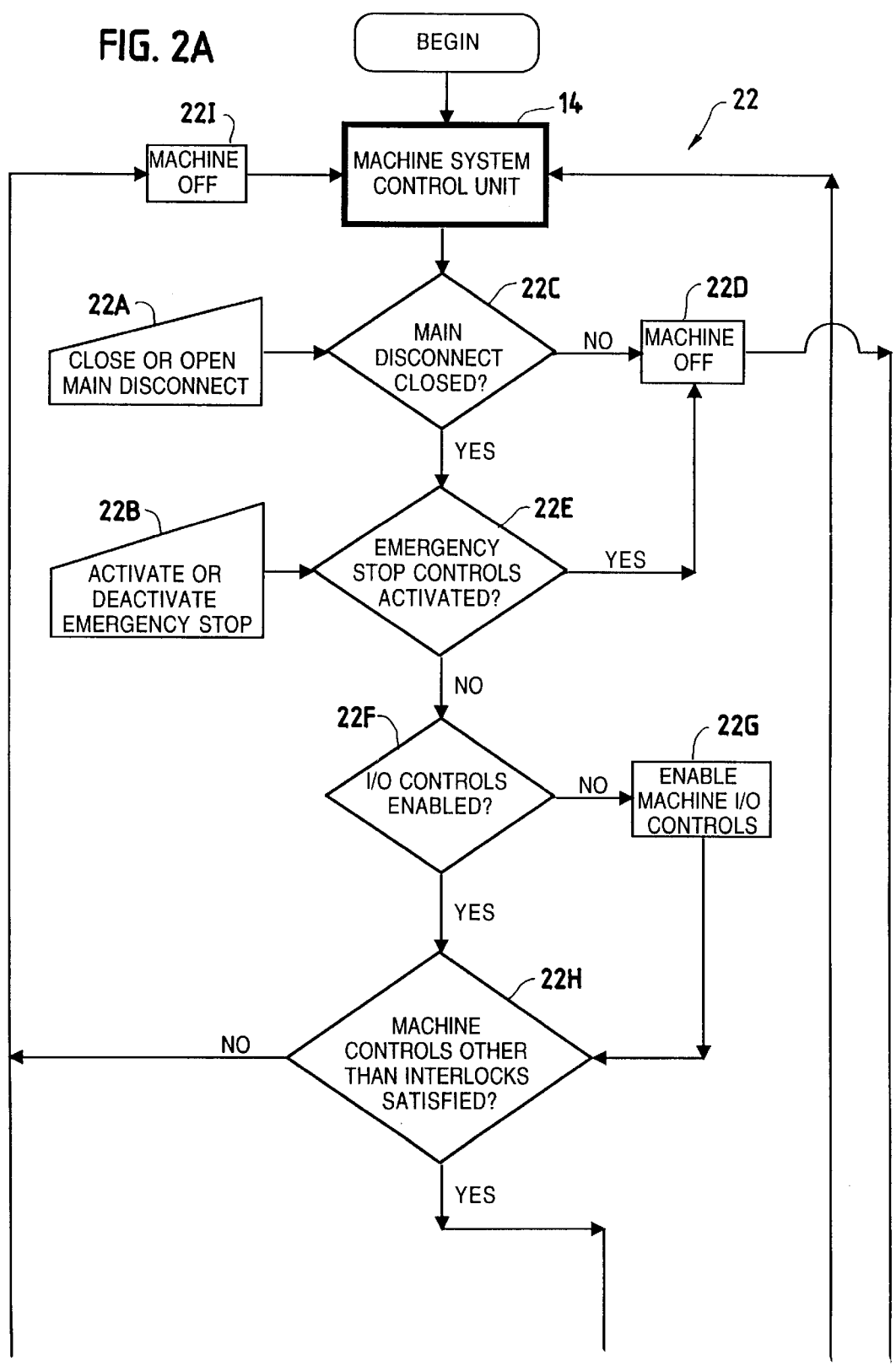

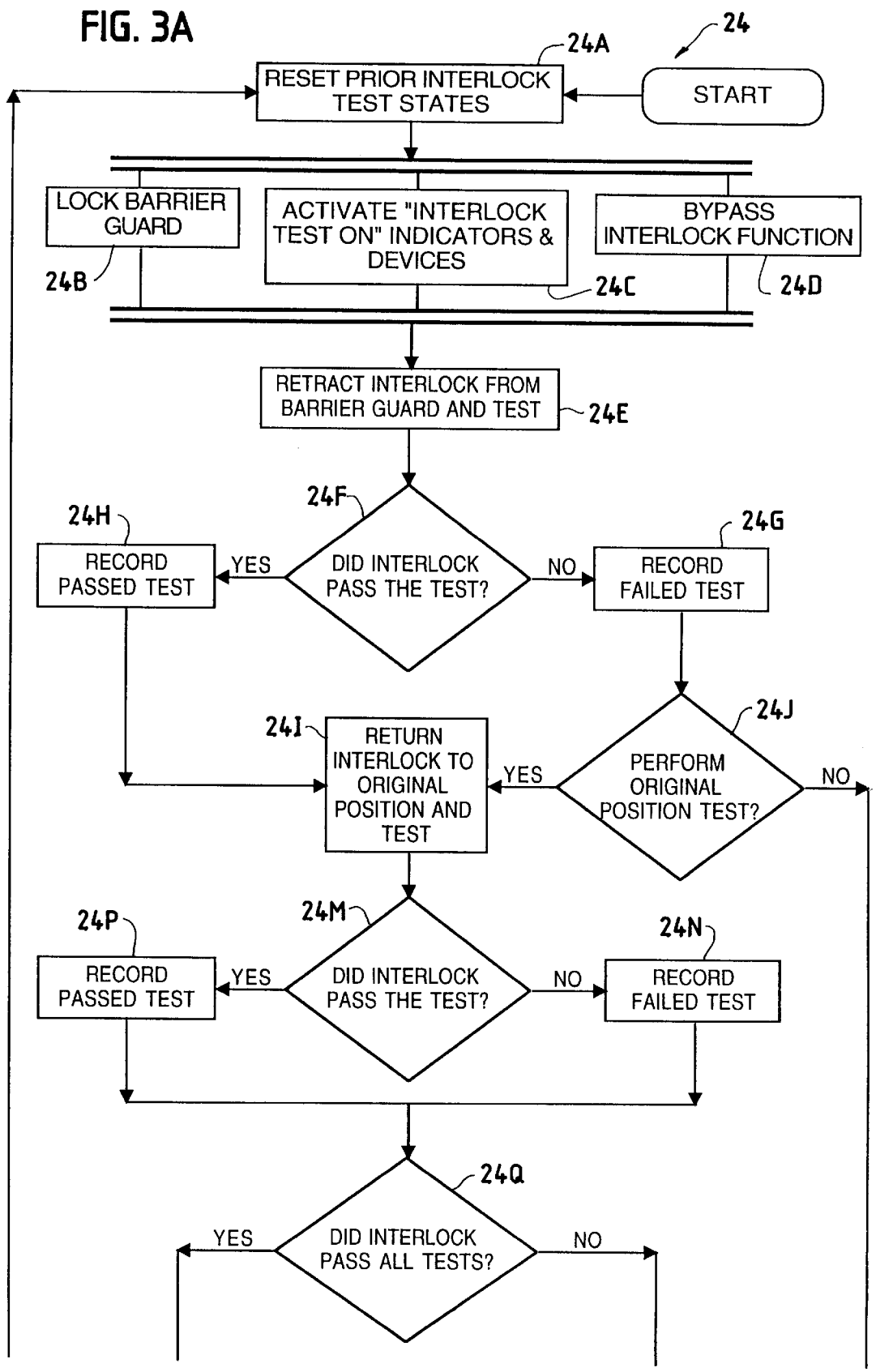

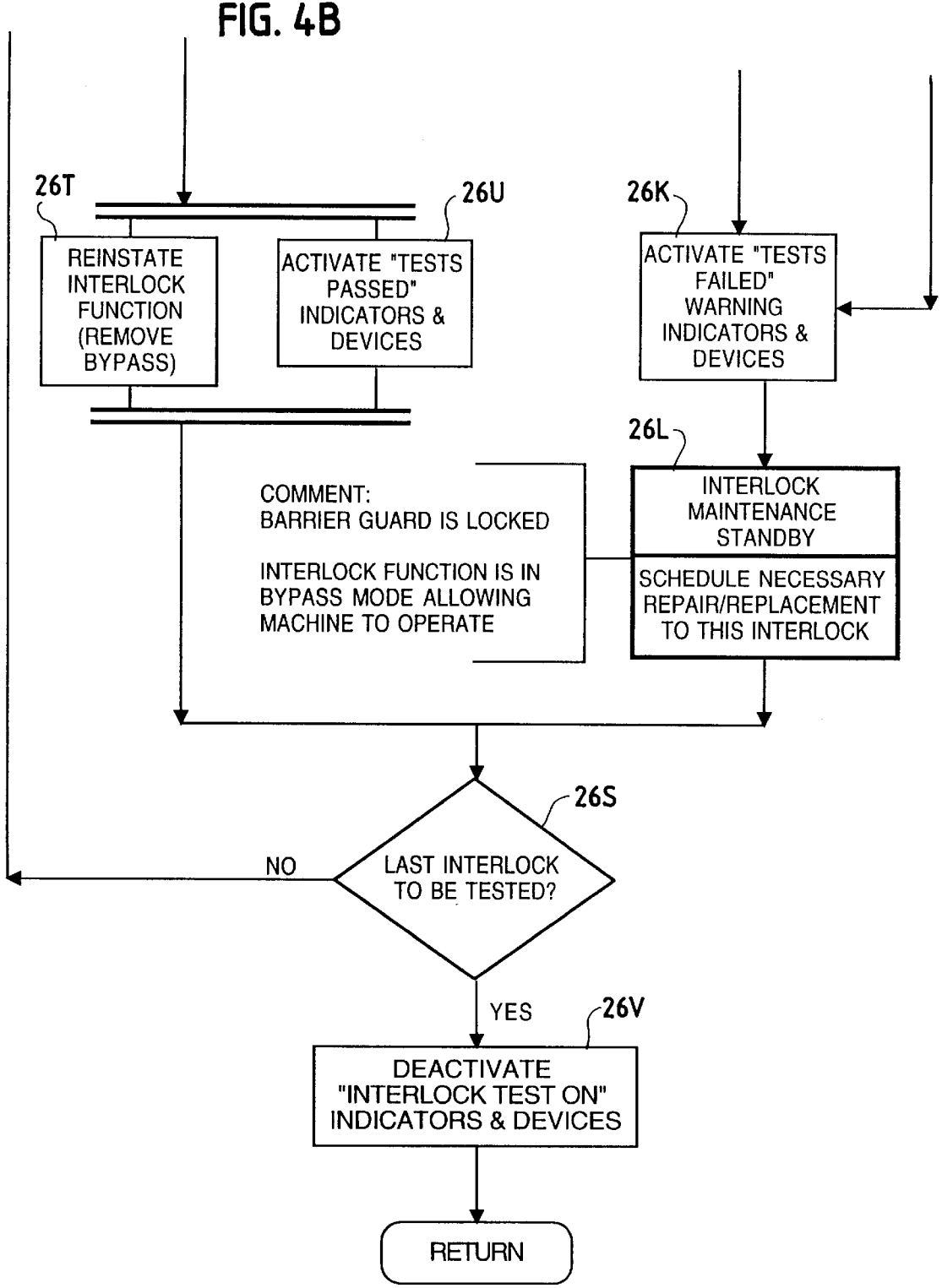

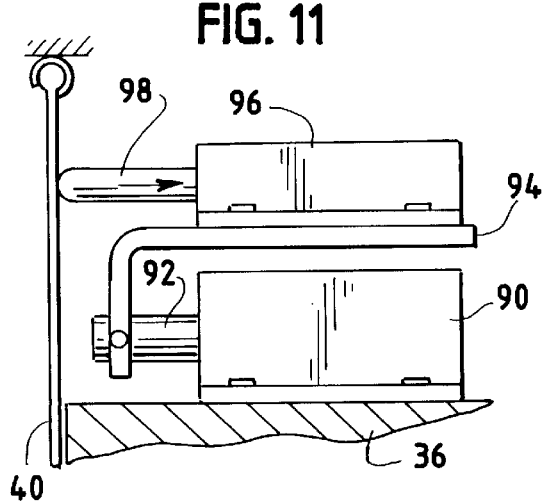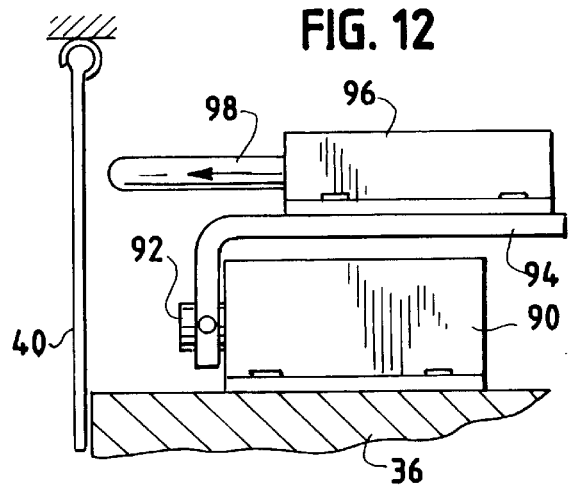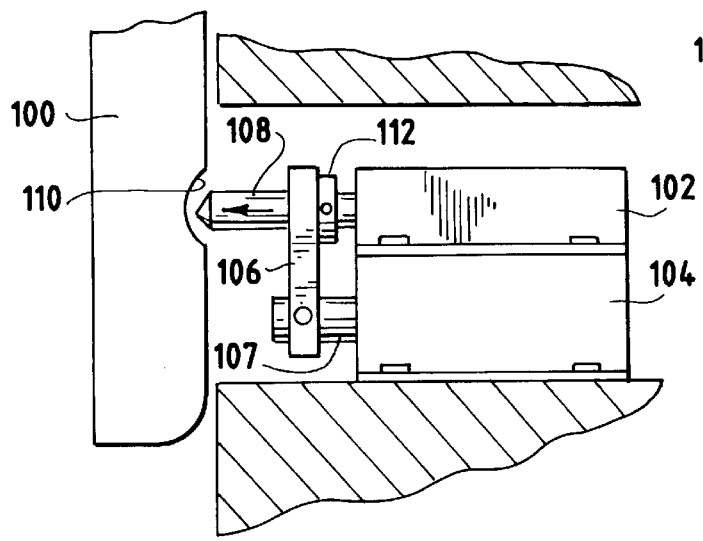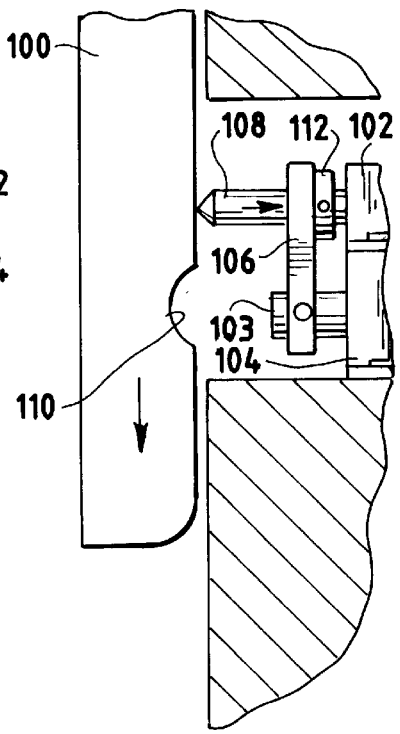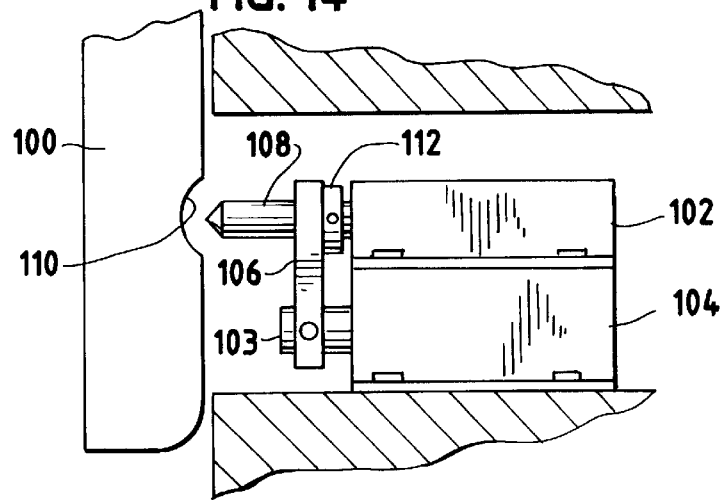

REMOTE AND PROXIMAL INTERLOCK TESTING MECHANISMS AND TESTING SYSTEMS

FIELD OF THE INVENTION

This invention relates to various interlock testing methods, mechanisms and systems to be used to test interlock mechanisms and systems to insure that the interlocks are functioning properly so that when they are called upon to operate, they will perform in the prescribed manner. In the typical situation, an interlock is located inside a guarded space of a machine containing safety hazards, the access to which is protected by means of a guard. The guards referred to therein can be structural barriers, such as, for instance, doors, gates, covers, hatches, trip wires, pressure pads, etc., or they can be non-structural barriers, such as, for instance, light curtains, RF barriers, capacitance barriers, air curtains, etc. Depending on the type of guard, when the guard is opened, moved, removed, disrupted, or otherwise breached to permit personnel to access or work in the now exposed space, the interlock acts to change the operating state of the machine, or often to shut down the machine to eliminate or at least substantially reduce the risk of injury to one subsequently accessing or working in the unguarded space. Essentially, the power supply or control system to a machine and the movement, disruption or breaching of the guard or entrance into the "guarded" space are "interlocked" by a safety device so that opening, disruption or breaching of the guard or otherwise entering the "guarded" space effectively signals the control system to change the operating state of the machine to eliminate or substantially reduce the dangerous conditions in the guarded space, or switches off the power to the machine. Once effected, it is intended that the machine remains in that changed condition while the guard is open or the guarded space breached even if there is an attempt to restart or restore the operating state of the machine at the main control box of the machine or from elsewhere.

BACKGROUND OF THE INVENTION

To fully appreciate the invention, one must understand the nature and operation of interlock mechanisms and their great importance to our heavily industrialized society. There is a constant and continuous need to work on industrial equipment in a quick and efficient manner without jeopardizing the safety of personnel. The present invention is directed to testing systems and mechanisms for ensuring the integrity of interlocks so that they will function correctly with the passage of time and without the need to open the guards or disrupt the operation of the machinery guarded by them. Interlocks may be any go not-go device, and they can be mechanical, electrical, electronic, electromagnetic, magnetic, pneumatic, hydraulic, etc., and their combinations.

To fully understand the various ramifications of applicant's novel testing system and to employ same, one must have a basic understanding of the way interlocks function and to provide this assistance, there are provided examples of various typical types of interlocks that have been modified, where necessary, to permit testing.

Generally speaking, all interlocks contain a sensor whose state is changed when a change of the relative positions of the interlock sensor and the guard it is acting on takes place such as by movement or the state of the sensor is changed when, through some means interposed between the sensor and the guard, the guarded space is accessed or breached. It is the change of state of the sensor that is utilized to change the operating state of the machine or to shut down the machinery posing the hazard in the guarded space.

For instance, if the interlock sensor is a normally open pushbutton switch which is kept closed by the guard then, when the guard is opened, the change of the relative position of the guard to the switch allows the pushbutton to spring open, causing the switch to change from the closed to the open state and thereby to change the operating state of the machine or turn off the machine.

Similarly, for example, if the guard and interlock system is a light curtain, the curtain of light beams serves as the guard and one or more light receptors serve as the interlock sensor. When an object breaches the curtain, the light path is changed, shading some of the receptors, changing thereby the state of the light sensor.

Various types of interlock mechanisms have long been used to change the operating state of the machine or to turn off a machine when an operator has to do work in a space where there are moving parts or other hazards to insure that the operator will not be injured when working in the normally guarded space or on the machine. Safe industry practices require that exposed moving parts must be shielded by guards to safely prevent personnel from being injured by coming into contact with hazardous areas of machinery. Needless to say, safety around operating machines has long been a concern in our heavily industrialized world. The design of highly efficient and effective interlock mechanisms that have a high degree of integrity so that they will always act to shut down or otherwise control machines when work is to be done in a space in which there are moving parts and/or other hazards have resulted in continuous development to produce a better interlock. New harmonized European standards and worldwide safety regulations stress the need for proper safety interlocking of machinery.

The integrity of a safety device is defined by its ability to perform its function without failure or default. The greater the risk that exists, then the greater must be the integrity of the safety interlock system required.

There is an all pervasive need to produce an interlock that will not fail. While significant strides have been made, this has not been accomplished, and thus there has long been a need to be able to quickly and efficiently periodically test the many and varied interlocks disposed about machinery to determine whether they have failed or not, and to undertake remedial action if an interlock has failed, so that when they are called upon to act, there is a very high degree of certainty that they will do their intended job. It is to this end that the present invention is directed.

It is not uncommon to enter a plant and observe signs that state in bold letters that "safety is our number one priority" and thus a great deal of attention has been paid to interlock mechanisms to insure that they are located in any area where someone might come in contact with a hazardous part of a machine by opening a guard, but insufficient attention has been paid to testing the interlocks to ensure that they maintain their functionality and integrity. In most of the industrialized countries around the world, there are laws and regulations that require that exposed moving portions or other hazardous sections of machines be covered by locked or movable guards equipped with interlocks to prevent entanglement and injury to the operator by the moving and other hazardous parts of the machine, but unfortunately this is only part of the story if there is not a continuous testing program of the interlocks, since if not tested they may be giving a false sense of security.

Locks on guards have been used for a long time. Such locks will usually not open until powered operation has been interrupted for a predetermined time interval to permit the machine to totally run down or to change its operating state to one eliminating or substantially reducing the hazards of the guarded space. Alternatively, such locks will not open until both powered operation has been interrupted and the moving machine parts have come to rest. The state of rest is generally established by zero speed switches or motion detectors. Sometimes interference devices are inserted into the machinery to assure that motion has been arrested (inserting a stick into the spokes of a wheel). In all of the cases where locks are used, an interlock is incorporated to prevent the machinery from assuming powered operation while the structural guards (barriers) or non-structural guards (light curtains, for instance) are open or out of their protective status. This is where the reliability of interlock mechanisms plays an important and vital role. When called upon to function the interlocks must act to preclude machine start up under powered operation. Interlocks must perform their intended function or else personnel will be placed at risk.

It is very common to observe signs posted around machinery cautioning operators to "shut down the main power to the machine before doing any maintenance or repair work." But even with the proliferation of such signs, the admonitions are often ignored and to a large extent the machine operators rely on the functioning of the interlock systems to prevent their being injured, which further emphasizes the need for a testing system that will insure that the interlock will function when called upon.

Furthermore, even with a well designed interlock system other considerations such as time pressures, production requirements, etc., are dealt with by clever personnel who can and may circumvent the interlock mechanisms by preventing the interlocks from functioning when opening the guards or actually bypassing the interlocks so that the machines will continue to operate while they are working in an unguarded space and with no assurance that the interlock is restored to its functionality afterwards. An interlock that is bypassed has the same functional characteristics as one which is stuck or welded or frozen so that it will not change states. Consequently, the present invention will detect a bypassed or sabotaged interlock as part of its normal testing capability. Once a bypassed interlock is detected, one may either preclude further powered operation of the machine or the structural guards or barriers may be locked into their closed positions until the bypass is removed. Sabotage can never go undetected because it is a long term condition that any regular interlock testing program will uncover. Bypassing, which is a temporary condition, cannot remain unnoticed for longer than one testing interval. Frequent testing will all but eliminate temporary unauthorized bypassing of the interlocks.

It is a gross understatement to state that industry has needed for a long time to quickly, efficiently and periodically test interlocks either automatically or by simple manual manipulation with or without requiring that the guard be opened. Interlocking mechanisms like many other devices are capable of getting stuck, worn out, becoming inoperative, or failing to function for a variety of other reasons that will preclude them from operating successfully when called upon. Unfortunately, interlocks can present a false sense of security to one opening a guard on a machine believing that either the machine will shut down or that it will not restart so that one need not be concerned about beginning to work in the now unguarded space.

Even though there has been awareness of the potential malfunctioning or circumvention of interlocks, there has been no readily available means for quickly, efficiently and repeatedly testing the interlock devices to determine and insure that they are functioning satisfactorily. Conventional available methods for testing existing interlocks include (1) starting the machine and laboriously and manually opening each guard to determine if the machine will shut down or change its operating state as required beginning with one guard and then starting the process all over again with the next guard or (2) sequentially opening the guards with the machine in a shut-down position or the changed operating state and attempt to start the machine or to restore the operating state to determine if the interlocks are functioning properly. That this is time and labor intensive therefore costly and adds unnecessary wear and tear to the machine is self evident. Both of these testing procedures expose operators to a moving machine and other hazards when a defective interlock is being tested.

Regular verification of interlock integrity very seldom takes place because it is time-consuming, interferes with work schedules and may be otherwise difficult to perform, thus leaving interlocks dormant. Since testing of interlocks tends to be neglected, then when they fail due to various causes, the failures remain undetected and the hazards they are supposed to protect against become unprotected or compromised. Also, since interlocks may be remote from the machine operator, extra personnel and coordination is required. Such additional effort and cost provides an additional excuse for not testing or extends verification time intervals. Unfortunately, this is further exacerbated by those personnel that circumvent the interlock mechanism in order to save time, or work in the unguarded space when the interlock mechanism does not function properly, so that they will not be "inconvenienced" by going to the main power or control source to shut the machine off or change its operating state. Operators may consider interlocks a nuisance and will not even report inoperative interlocks. The present invention will uncover temporary bypassing of the interlocks within the testing interval set by a program unit.

It can be appreciated that if repeated testing of the interlock systems can be accomplished to insure proper operation, that the operator will "be saved from himself" in that his reliance on the interlock always functioning correctly may almost be justified. An ongoing quick, and efficient testing system to maximize one's assurance that the interlock system is properly functioning as well as to detect malfunctioning interlocks will go a long way to eliminate or substantially reduce the safety hazards that will occur by malfunctioning interlocks when operators are unwilling to go to the main power or control source and lock out the machine or change its operating state before beginning their work in the hazardous space guarded by the interlock. There has also long been a need to automatically lock a guard in closed position when an interlock malfunctions to insure that personnel will not be injured.

It is the aim of the present invention to provide test mechanisms and systems that will ensure confidence that reliance on interlock systems to perform their tasks when and as received is not misplaced. The invention does this by detecting and identifying which interlocks and their systems are not faulty and which are, and by providing remedial means and actions to those interlocks and systems, and the barrier guards they protect, which have been found faulty. Furthermore, the invention provides the methodology to do the testing, and to apply and then to maintain the remedial actions and means for as long as necessary, without interrupting or disrupting the operation of the machinery. This allows for the scheduling of maintenance, repair or replacement of faulty interlocks and systems at times compatible with the operation of the machinery.

For purposes of this application, the following meaning of terms and expressions is intended here and elsewhere in the application.

Reference to the term "the change of state of an interlock" and similar terms shall be construed to mean a physical change of state of the interlock and the corresponding intended consequential direct or indirect change of state of a machine controlling parameter, most often an electrical parameter, such as, for example, current, voltage, resistance, inductance, impedance, and magnetic field associated with an interlock. For example, and without limitation, a switch of an interlock may be opened or closed, representing physical changes of an interlock producing a change of a machine controlling voltage or current from a first state to a second state.

If opening of a guard is stated or referred to, it shall be construed to mean opening, moving, removing, disrupting, or otherwise breaching of a structural or non-structural barrier guard. Any of these terms, when mentioned in the text, should be understood to be interchangeable where applicable.

A reference to shut down and/or lock out of the machine or machinery shall be construed to mean that, or the alternate of changing the operating state of the machine, machinery and/or its system without shut down or lock out if desired and applicable, and as consequentially or by design substantially or completely reducing the hazards of the interlock guarded space.

Throughout this patent application, failure of the interlock and/or its system shall be taken to mean a failure of the interlock device and/or its system and/or failure of the testing device and/or its system.

SUMMARY OF THE INVENTION

The instant invention comprises a testing system and mechanisms therefor which utilize the relative nature of the position change between the interlock sensor and the guard or, where applicable, the interposition of some means between the sensor and the guard, or any other suitable means to change the state of the interlock sensor. This is the common nature of operation of interlocks of all types. Essentially the system provides for remote or proximal testing sensing this change of state with or without opening a guard, as desired, and with or without shutting down the machinery or changing its operating state, as desired, during testing. In addition, the system can provide for preventive locking of the guards during the test and/or in the event the interlock system fails the test.

The position change test mode is accomplished by a test system including an interlock and mechanism which is designed to impart to the interlock sensor portion a position change or relative motion, which normally would be caused by opening of the guard. It thereby allows the interlock sensor to change its state as it would in its normal interlock operation, and can be done without the necessity to test the interlock by opening the guard or it can be designed to move the guard to accomplish this. Where required, such as with the light curtain example of a non-structural barrier referred to previously, the test mechanism does the testing by interposing a probe in the path of the sensor. It is to be noted that the test system may also be designed to bypass the interlock being tested so that the machinery will not be shut down during the interlock testing phase and, if so desired, remain bypassed after the test has been completed and a faulty interlock has been detected. This latter approach, referred to here as interlock maintenance standby, allows for the scheduling of maintenance, repair or replacement of faulty interlocks at times compatible with the operation of the machinery.

The state of the interlock can be sensed and it can be determined whether the interlock has changed or has failed to change state. Corresponding test system output signals would indicate, inform and/or record whether the interlock has passed or failed this test. After completing this phase of the test, the interlock is moved by the test mechanism to its original safeguarding position against the guard for the performance of the second phase of the test. Likewise, the guard returns to its closed position, if it has been moved during the first phase of the test. The state of the interlock is now sensed again to determine whether the interlock has changed or failed to change its state back to its safeguarding function required by its restored position. Corresponding test system output signals for the second phase of the test would indicate, inform and/or record whether the interlock has passed or failed this test. The second phase of the test need not be performed if the interlock has failed the first test phase. Nevertheless, it may be desirable to perform the second phase test anyway, since it furnishes additional information about the interlock status.

If the test mechanism and/or its system suffer a failure which prevents their performing the interlock testing, such failure will be detected indirectly as an interlock failure during a scheduled interlock test, since the expected change of state signals from the interlock will not occur. Furthermore, by providing the test mechanisms with sensors, for instance limit switches, the malfunction of the test mechanism and/or its system can be detected and identified directly as such from the status of these sensors.

As stated previously, the testing system can provide for preventive locking of the guards during the test and/or in the event the interlock system fails the test. The locking devices utilized for this can be equipped with sensors whose status can inform the system of the locking status of the devices.

Applicant's invention is applicable to the remote and proximal testing of interlocks with all types of sensors, including mechanical, gravitational, electrical, electronic, magnetic, electromagnetic, light, infrared, ultraviolet, airflow, fluid, acoustic, intelligent sensors, etc.

Applicant's invention tests the physical interlock mechanism and its operating system to determine if the interlock system functions correctly or has failed.

Applicant's invention, furthermore, tests the interlock system in its operational position, its open or retracted position, and its restored or original guarding position.

Applicant's invention, in addition to detecting interlock failure, will also detect failure of the test mechanism and/or its system, indirectly as an interlock failure, when no failure detection sensors are built-in into the test mechanism and/or its system to detect such failure.

Applicant's invention, in addition to detecting interlock failure, will detect failure of the test mechanism and/or its system directly when failure detection sensors are built-in into the test mechanism and/or its system to detect such failure.

As part of applicant's invention, the interlocks protected barrier guards can be equipped with locking devices as part of the interlock testing system, and the locking devices can be equipped with sensors whose status can inform the system of the locking status of the devices, before, during, and after the test.

In accordance with the present invention, there are various novel interlock testing constructions and systems illustrated and disclosed that enable the various interlocks to be manually or automatically tested. By the utilization of suitable timing devices, the testing can be done on a specified schedule or repeatedly, such as, every hour, daily, weekly, monthly, etc., as desired to insure that the interlocks are properly functioning. The frequency of testing is largely determined by various factors, such as possible failure rate, frequency of exposure of the hazardous space, location, etc. The aim is to assure with great reliability that if a guard is opened, there can be almost total confidence that the interlock will operate and turn off the machine so that personnel removing the guard and working in the guard protected space on the machine will not be at risk. Where the testing is done without shutting down the machinery, suitable precautions are provided to indicate when the interlock has been bypassed during the testing phase and, if desired, the guard may be locked into position during testing. The locking mechanism may also be designed and controlled so that when the interlock is found to be inoperative or defective, the guard will remain locked and can only be opened by authorized personnel. In addition to, or in place of a lock, an indicator light or flag may be activated at the guard/interlock if it is found to be inoperative to warn of the unsafe condition.

Another feature of the automatic testing of the interlock system of the present invention is the detection of unauthorized bypassing of interlocks. Attempts to permanently or temporarily bypass an interlock will be noticed during the scheduled test phase following the bypass. The bypassed interlock would be identified and the guard can be placed on maintenance standby or locked against further use. When short test intervals are utilized, even unauthorized temporary bypassing of the interlocks is frustrated. Currently available bypass preventing interlocks do not rise to the capability of the present inventions.

It should be noted that the inventions allow fixed guards to be interlocked without the drawbacks associated with such dormant interlock systems that traditionally cannot be regularly tested. Because of the present inventions, the testing of interlocked fixed guards are now a practical possibility.

The overall system is illustrated by example, schematically in FIG. 1. Examples of operating logic for a machine as it relates to remote testing of its interlocks, where the action of opening its barrier guards protected by interlocks turns the machine off, are illustrated in FIGS. 2–5.

While the present invention is primarily directed to the testing of interlocks and not to interlocks per se, it must be appreciated that there are certain features that must be included with existing interlocks in order to accomplish the testing functions. Thus, as aforementioned, a change of state of the interlock sensor has to be effected in order for the interlock to be tested. Thus, a part of the inventive interlock testing system requires that the interlocks be constructed and arranged so that testing thereof can take place. To this end, it is necessary to illustrate and describe relevant structural features that have to be incorporated with various interlocks in order to facilitate their testing. The illustrated examples are merely intended to be exemplary and not limiting. The essential ingredient is that the interlock be capable of being moved, breached or otherwise have its sensor state changed so that the interlock can be tested remotely or proximally with or without opening the guard or shutting down the machine as desired.

The testing procedure must be able to handle a wide variety of situations. This includes the guard being locked or stuck, springs not functioning to reposition sensor arms, sensing pins sticking, limit switches malfunctioning, etc. Essentially, the testing procedure is intended to include those eventualities likely to occur that will prevent the required operation of the interlock relative to the guard. This testing can be done in a mode to actually turn off the machine, or as aforementioned, the testing control system can include an automatic programming arrangement to bypass the interlock during its testing period while taking suitable precautions that personnel are aware that testing is occurring by an appropriate signal, such as a light or sound emitting device.

In the situations where it is desired not to shut the machine down when testing the interlock system, a control unit or other suitable mechanism will be used which will be programmed so that the interlock's power interrupt function and/or other relevant controls and functions will be temporarily bypassed for the duration of the test cycle while the interlock is quickly tested by changing the state of its sensor and then restoring its state to complete the test cycle. The control unit will indicate whether or not the interlock is functioning satisfactorily. In the event the interlock is not working, the machine can be automatically shut down and the interlock may be repaired or replaced, or the control unit may merely identify a bad interlock, on which a decision can be made how to proceed. If desired, the system can include the activation of a locking mechanism to lock the relevant guard closed and allow the machine to continue to operate until it is prudent or convenient to repair or replace the interlock.

Several of the aforementioned test system embodiments employ a limit switch or magnetic relay type interlock sensor and the movement of the limit switch or a change in the magnetic field is registered by the controller after the switch or relay has been moved relative to a guard. In one embodiment (FIG. 6), a movable outwardly biased plunger can be employed to slightly move the guard to a position where it will allow the interlock switch or relay sensor to be tested to see if it would function to turn off the machine. If the guard is locked or stuck in position (FIG. 7), the switch or relay is moved away from a guard to permit testing of the interlock switch or relay.

To facilitate movement of the interlock assembly relative to a guard, the interlock control means such as a relay or limit switch sensor is affixed to a resilient mount on the machine frame or guard to enable the relay or limit switch to move relative to the machine frame or guard (FIGS. 6 and 7). A resilient mount deforms under the influence of an external force and restores essentially or completely its shape after the deforming force is removed from it. Movement of the interlock control means is accomplished by a motorized screw or solenoid plunger placed in engagement with the guard (FIGS. 6 and 7). Thus, if the guard is free to open, the motorized screw moves the guard to the slightly open position and the interlock control means will then be free to move and signal if it is or is not working properly to a program unit and/or some type of suitable indicator, such as a sound or light device. In the event the guard is fixed in position, the motorized screw will engage the guard and will force the interlock mechanism and switch backwards away from the guard as permitted by the resilient mount design. The movement or lack of movement of the interlock sensor will be indicated on the program unit.

In the event a magnetic interlock is used (FIG. 8), it will be operated in the same fashion, only in this case the resilient mount will be mounted on the guard (FIG. 8), and a magnet will be pushed away to open the gap and thus change the existing magnetic field and indicate whether or not the magnetic interlock is properly functioning.

Applicant's novel test system also works very effectively with an interlock that uses a toggle mechanism operated by a solenoid (FIG. 9) that will initially move the guard to the open position if it is free to be opened or will result in the interlock limit switch being moved backwards relative to the fixed guard which in this case is biased toward the guard by a spring mechanism. Spacing the interlock from the guard, tests the interlock to see if it is properly functioning. The interlock control means is located on rollers to permit it to move against the action of the biasing spring.

Another modified interlock arrangement (FIG. 10) that can be used in a test system involves the use of flat springs to which a roller interlock mechanism and pusher unit is connected to permit resilient movement of the roller interlock and pusher unit away from the guard to facilitate testing in the event the guard is stuck. If the guard opens in response to movement by the plunger member of the pusher unit, the resilient mounting arrangement need not come into play.

Another illustrated type of interlock embodiment to be used in a test system (FIGS. 11 and 12) is an interlock that employs a linear actuator that is affixed to a machine base and has connected to its actuator shaft a test arm that is secured to an interlock sensor including a sensor arm. In this arrangement, the linear actuator would be activated to move the interlock sensor away from the guard and in such position the integrity of the interlock is tested by sensing whether or not the sensor arm is functioning properly to shut off the machine. All of the aforementioned modified interlock embodiments to be used in a testing system were by way of illustration applied to interlock sensors that require positive movement by a sensor arm and if such movement does not occur, a program unit indicates that the interlock was not functioning correctly. As can be appreciated, while these interlock devices are relatively simple in design, they have the disadvantage that if the guard is opened and the sensor does not function properly the machine will not stop running, which may present a safety hazard.

Other types of illustrated interlock designs that can be tested using applicant's novel system include an actuator where the interlock is moved to mimic its operational behavior by positively moving the sensor arm, as illustrated in FIGS. 13 and 14, or moving the sensor arm against a spring force (FIG. 15) to a position that turns the machine off when the interlock system functions properly. In these embodiments, when the test system is in the testing mode, the linear actuator in FIGS. 13 and 14 and the solenoid unit in FIG. 15 are the test mechanisms which move the interlock sensor into the retracted and extended positions and test the interlock system for proper function in both sensor positions.

There are two other illustrated designs which essentially permit testing by manual movement of either a resiliently biased plunger or the opening of a guard a limited amount (FIGS. 16 and 17). In the case of the plunger (FIG. 16), it is operated to pull a blocking member away from a limit switch interlocking mechanism to allow the switch to extend automatically to turn off the machine if it is functioning properly. A suitable signal would be provided so that when the button is pulled and the switch did not move to turn off the machine it would indicate that the interlock was not working.

Another way of testing interlocks (FIG. 17) without requiring full opening of a guard that would permit access to a hazardous space is to provide guards with limited restrictive movement which movement would be only enough to allow an interlock to have its integrity tested by permitting the sensor to move into the provided space or tested by the automatic means illustrated in FIG. 6. In this embodiment, there is also illustrated an arrangement whereby a locking mechanism is provided in conjunction with the limited movement control so that in the event the interlock is tested and does not function properly, the arrangement restricting the movement of the guard will remain in place to prevent the guard from being fully opened. The movement control mechanism will be designed so that the guard can then be opened only by a supervisor.

It can be appreciated that most, if not all, of the interlock mechanisms can be used in conjunction with a suitably provided device to lock the guard closed during testing and/or preventively lock the guard if the test has detected that the interlock is malfunctioning. It is a simple matter, as illustrated in the logic flow diagrams of FIGS. 2–4, to include in the interlock test system circuitry control means for operating a lock to prevent a guard from being opened. As indicated previously, such locking devices can be equipped with sensors whose status can inform the system of the locking status of the device before, during and after the interlock test.

An example of a mechanism that will function to positively lock a guard in position during testing is illustrated in FIGS. 20–22.

BRIEF DESCRIPTION OF THE DRAWINGS

In the following drawings there will be a number of illustrations setting forth the novel testing system employing various types and designs of interlock arrangements.

FIGS. 2, 2A and 2B illustrate a flow diagram of a main routine for testing interlocks;

FIGS. 3, 3A and 3B illustrate a subroutine of the main routine of FIG. 2 to carry out testing of the interlocks;

FIGS. 4, 4A and 4B illustrate another subroutine of the main routine of FIG. 2 to carry out testing of interlocks;

FIGS. 6–19 illustrate various types of interlocks including various features which permit them to be tested either remotely or proximally wherein FIG. 6 shows a resiliently mounted interlock opening a guard during testing;

FIG. 7 is a view similar to FIG. 6 in which the interlock has been moved relative to a guard so it can be tested when the guard is in a locked or stuck position;

FIG. 8 discloses a magnetic sensor interlock including a test device acting against a resilient mount to facilitate testing thereof;

FIG. 9 illustrates a modified interlock mechanism that uses as the test mechanism a toggle mechanism operated by a solenoid to move a plunger, which interlock is free to move on rollers so it can be tested;

FIG. 10 is another embodiment in which the interlock test mechanism employs a plunger that is mounted relative to a fixed base by flat springs to permit movement relative to the guard if the guard cannot be opened so the interlock can be tested;

FIG. 11 is an interlock arrangement in which an actuator can be operated to move an interlock sensor unit away from the guard to where it can be tested to determine whether the interlock is properly functioning;

FIG. 12 is a view similar to FIG. 11 showing the interlock sensor unit removed from the guard by the actuator;

FIG. 13 is an interlock test embodiment using an actuator to move a sensor pin relative to its housing to determine if it is in proper working order;

FIG. 13A shows the sensor pin in position when the guard is open;

FIG. 14 is a view showing the interlock of FIG. 13 in the testing position;

FIG. 15 discloses a solenoid relay type test mechanism acting on an interlock which is of the normally closed held open type that functions by moving the actuator and does not require that the guard or interlock body be moved;

FIG. 16 discloses a manually operated plunger which when moved relative to a guard permits testing of the interlock;

FIG. 17 is a view showing a hinged guard having a limited movement to permit manual or automatic testing of an interlock caused by the limited movement of the guard and which also includes a mechanism that limits and controls the movement during testing and can be used to afterwards preclude full opening of the guard in the event the interlock fails during testing;

FIG. 18 is a view illustrating a light curtain guard system;

FIG. 19 is a side view of the light curtain illustrated in FIG. 18 and a probe for intercepting the curtain to test the system;

DESCRIPTION OF THE PREFERRED EMBODIMENTS

Figure 1:
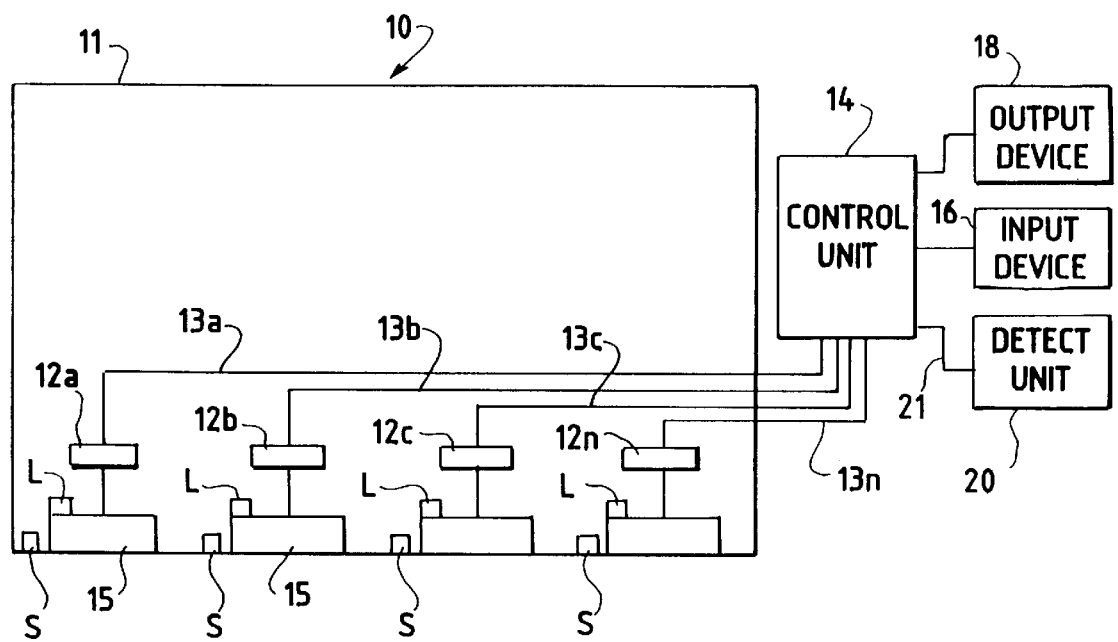
FIG. 1 is a schematic view of an automatic interlock testing systems.

Referring first to FIG. 1, there is illustrated a schematic view of a testing system 10 for a plurality of interlocks 12a, 12b, 12c . . . 12n mounted in various locations on an operating machine. The interlocks are provided to shut down the machine 11 when the space protected by any given interlock is exposed to permit access to working personnel. The interlocks are monitored by a control unit 14 which is programmed to respond to the action of each interlock when testing is to occur. The control unit 14 can selectively bypass the machine 11 shutdown function of each interlock if so desired at any selected interval determined by, for example, a timer, to permit testing of the interlock without shutting the machine 11 down. After an interlock is bypassed, it will be tested and the control unit 14 will indicate if the interlock is functioning properly. During the testing, suitable signaling devices (not shown) can be provided at desired locations, for instance, adjacent to each guard and the machine 11 operating stations, to indicate that the interlock has been bypassed so that a guard will not be inadvertently opened and personnel exposed to injury.

As shown in FIG. 1, the testing system 10 preferably includes one or more machines 11 (one being shown), a control unit 14, an input device 16, and an output device 18. The system 10 may also include one or more detection units 20 (one being shown), such as, for example, flow sensors, proximity sensors, heat detecting devices, to detect certain operating conditions of the system 10. The detection units 20 of the system 10 may communicate with the control unit 14 by transmission line 21 or any other suitable communication link. It will be recognized that the control unit 14, the input device 16, and output device 18 may be integral with the machine 11 or remote from the machine 11.

The machine 11 preferably includes one or more interlocks 12a,12b,12c . . . 12n and guards 15. Each of the interlocks 12a,12b,12c . . . 12n has a switch and may be in communication with or coupled to the control unit 14 by transmission lines 13a,13b,13c . . . 13n, respectively. The transmission lines may be one-way or bidirectional communication links of any suitable type.

Figure 3:
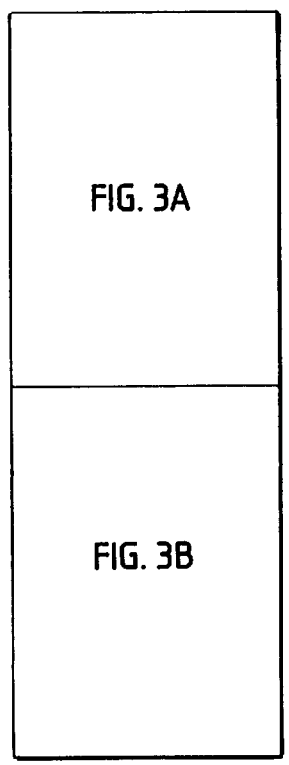

An integral locking mechanism L or a separate locking device S schematically shown mounted on each guard in FIG. 1 can be provided, if desired, to lock out a guard when the interlock therefor is being tested. Additionally, the locks can be configured and controlled to keep a guard locked if its interlock fails the test (see FIGS. 3–4). If the interlock has been bypassed to perform the test, the bypass can be maintained and the guard locked until the interlock is to be repaired or replaced during routine or specifically scheduled maintenance, thereby avoiding disruptions of scheduled machine operations for such repair or replacements. The control unit can be set to test the interlocks on any specified schedule, for instance, during each shift, hourly, daily, weekly, or any other interval. A signal or light, such as a light or flag, can be placed wherever desired, for instance, adjacent to each guard, and be suitably activated in the event the interlock fails, to warn personnel of this condition.

In FIG. 1, the input device 16 of the system 10 is in communication with or coupled to the control unit 14. The input device 16 may include a keyboard, a keypad, or any other suitable input device 16. The input device 16 may allow a number of versatile control or scanning functions to be utilized. For example, the interlocks may be continuously monitored or checked at a preselected time. Alternatively, the frequency and duration of monitoring all or a selected number of interlocks may be initially preset and/or changed.

The output device 18 of the system 10 is also in communication with or coupled to the control unit 14. The output device 18 may generate a message or an alarm that can be visual, audio, or whatever else is suitable, singly or in combination, when a malfunctioning interlock is detected. The output device 18 may include a display or a monitoring panel that may alert an operator that a trouble or an alarm condition exists and may also indicate the location of the malfunctioning interlock in the environment.

The output device 18 may further display a message to identify the corrective action required. The output device 18 may be designed at any level of sophistication or complexity in order to process the information about the status of the interlocks and to indicate that a problem exists with one or more interlocks.

The control unit 14 of the system 10 checks the functioning or operation of one or more interlocks as well as other machine controls. The control unit 14 may include, for example, a program unit, a processing unit, a computer, a programmable logic controller, a microprocessor, etc. The control unit 14 can be commanded with any suitable operating system, and can be digital, analog, hardwired, etc., or combinations of these. The control unit 14 can be commanded to continuously monitor the interlocks and test them in any sequence combination at a preselected schedule, frequency, duration, or randomly.

When the control unit 14 detects a malfunctioning interlock, a light and/or any other suitable alarms may be activated at the output device 18 and/or near the interlock, and the control unit 14 may place the interlock in a maintenance standby mode as further described below. A message indicating a malfunctioning interlock may also be displayed on the output device 18. The particular location of the interlock of the machine 11 may further be identified.

FIGS. 2–5 illustrate an interlock test routine executed by the control unit 14 to test one or more interlocks to determine whether the interlocks are functioning properly. If one or more of the interlocks is malfunctioning, the machine 11 may be shut down or the malfunctioning interlock may be placed on maintenance standby mode. The interlock test routine may be implemented by conventional hardware components and circuit designs, computer programming, and combinations thereof. Exemplary flow chart diagrams are described below, but it is understood that these are for the purposes of illustration only, and the flow chart diagrams may utilize any suitable implementation that will carry out the function of the process.

Figure 2B:
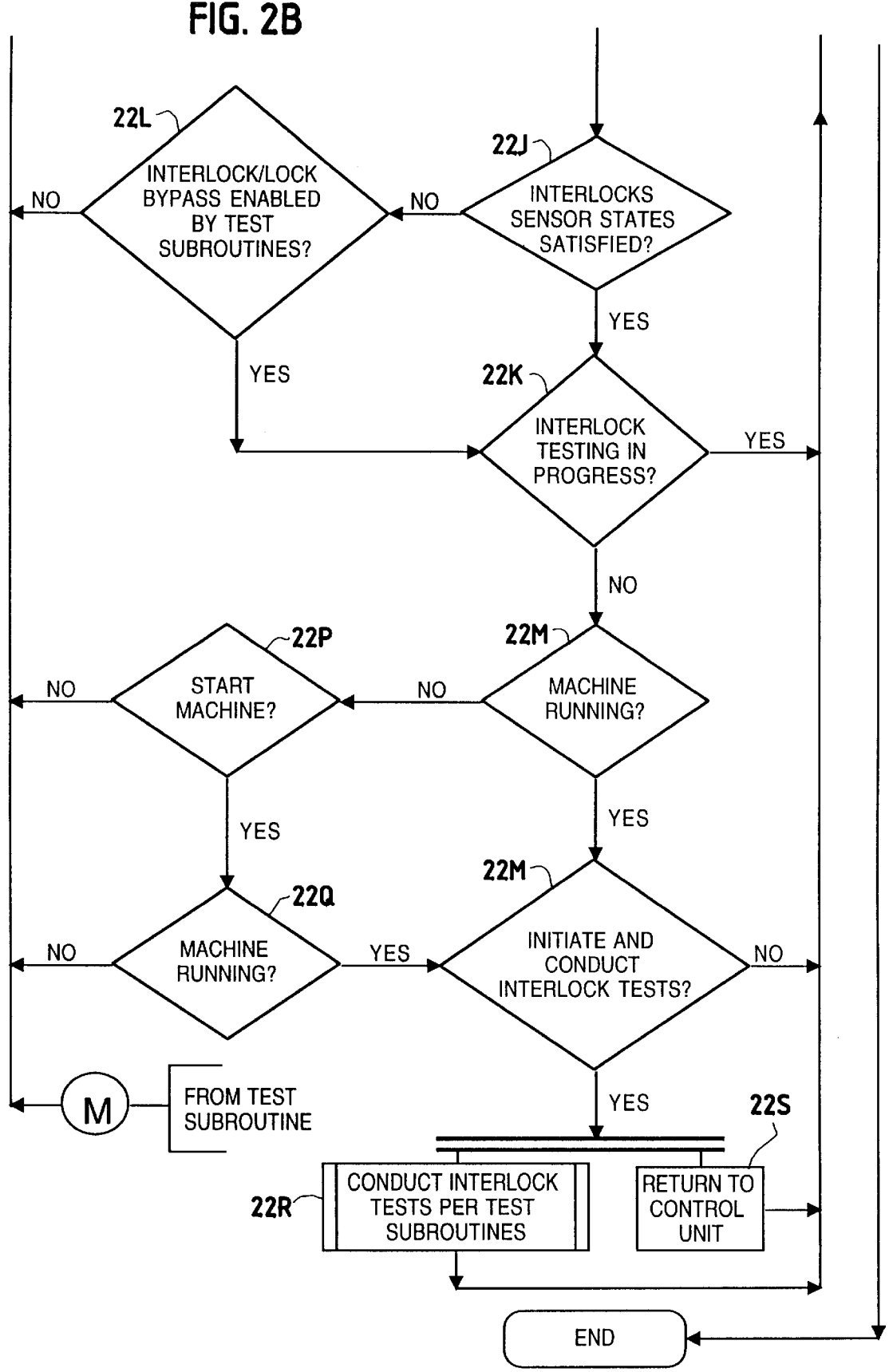

FIGS. 2, 2A and 2B illustrate a main routine 22 of the interlock test routine to test interlocks of a machine 11 of FIG. 1 in which the action of opening a barrier guard protected by an interlock turns the machine 11 off. It will be recognized that the main routine may test interlocks by sensing a change of state of the interlock (e.g., a change of an electrical parameter associated with the interlock). The control unit 14 of the machine 11 system may process all inputs and outputs, monitor all switches, and determine whether the machine 11 is operating properly. The main disconnect may be opened or closed at block 22A and the emergency stop controls may be manually activated or deactivated at block 22B. It is also contemplated that the main disconnect and emergency stop controls may be automatically controlled.

Initially, the control unit 14 determines whether the main disconnect of the machine 11 is closed at block 22C. If the main disconnect is not closed, the control unit 14 turns the machine 11 off at block 22D, bypasses the control center, and ends the interlock test routine. If the main disconnect is closed, the control unit 14 determines whether emergency stop controls, such as, for example, shutdown switches, are activated at block 22E. If the emergency stop controls are activated, the machine 11 is turned off at block 22D. If the emergency stop controls are not activated, the control unit 14 determines whether the input and output controls (I/O controls) of the machine are enabled at block 22F. If the (I/O controls) are not enabled, the control unit 14 enables the I/O controls of the machine 11 at block 22G to permit the machine 11 to operate for its intended function and the control unit proceeds to block 22H as further described below.

If the I/O controls are enabled at block 22F, the control unit determines whether the machine controls other than the interlocks are satisfied, such as, for example, heat sensor, proximity sensors, etc. If the machine controls are not satisfied, the machine is shut off at block 22I and the process returns to the control unit 14. If the machine controls are satisfied, the control unit determines whether the interlock sensor states are satisfied at block 22J. If the interlock sensor states are satisfied, the control unit determines whether an interlock test is in progress at block 22K. If the interlock sensor states are not satisfied at block 22J, the control unit determines whether the interlock bypass is enabled at 22L. If the interlock bypass is not enabled, the machine is shut off at block 22I and the process returns to the control unit 14.

If the interlock bypass is enabled at block 22L, the control unit 14 determines whether an interlock test is in progress at block 22K.

If an interlock test is in progress at block 22K, the routine returns to the machine system control unit 14. If no interlock tests are in progress, the control unit 14 determines whether the machine is running at block 22M. If the machine is running, the control unit 14 determines whether to initiate and conduct an interlock test at block 22N as further described below. If the machine is not running at block 22M, the control unit 14 determines whether to start the machine at block 22P. If the machine is not to be started, the machine is turned off at block 22I and the process returns to the control unit 14. If the machine is to be started at block 22P, the control unit 14 will start the machine and then determine whether the machine is running at block 22Q. If the machine is not running, the routine returns to the control unit via block 22I. If the machine is running, the process proceeds to block 22N.

At block 22N, the control unit 14 determines whether to initiate and conduct an interlock test. If an interlock test is not to be initiated, the process returns to the machine system control unit 14. If the interlock test is to be initiated, the control unit 14 will initiate an interlock test sub-routine at block 22R, and in parallel with this initiation the process returns to the control unit 14 at block 22S for the next pass through the main routine. When the block 22R completes its interlock test sequence described below, it too returns the process to the control unit 14.

Figure 3B:
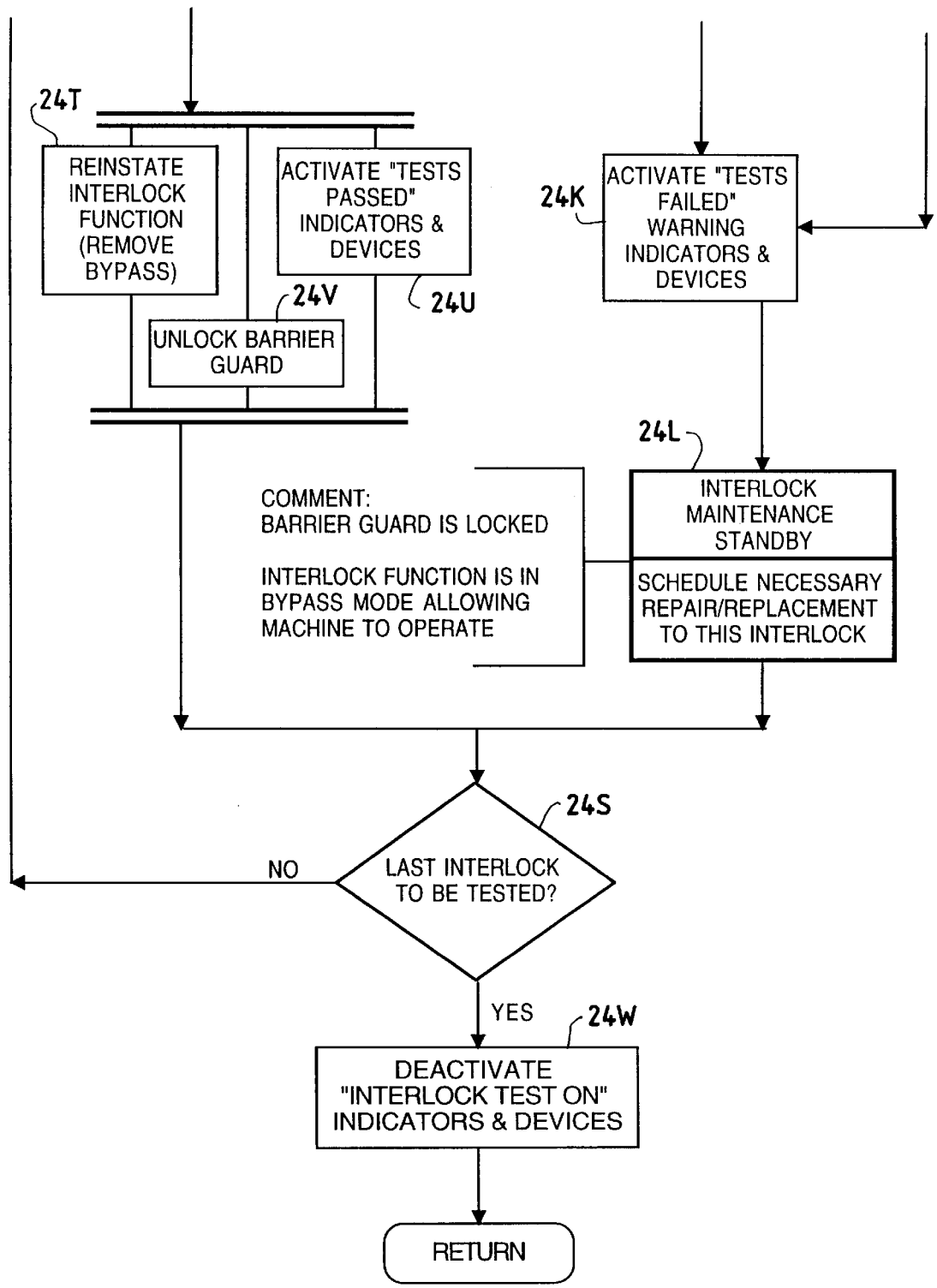

Preferably, three different sub-routines may be executed to test the interlocks. The sub-routines include a first sub-routine 24 (FIGS. 3, 3A and 3B) to test interlocks having a separate guard locking device S (see FIG. 17), a second sub-routine 26 (FIGS. 4, 4A and 4B) to test interlocks having an integral guard locking device L (see FIGS. 20–22), and a third sub-routine 28 (FIGS. 5, 5A and 5B) to test interlocks without a guard locking device utilized for the interlock testing.

The first sub-routine 24 of the interlock test routine is illustrated in (FIGS. 3, 3a and 3B) and includes the capability of bypassing the barrier guard interlock function of the machine 11 so that the machine 11 will not shut down when the interlock is tested. The first sub-routine 24 will also activate separate locking devices to lock the barrier guard. When the first sub-routine 24 is initiated, the memory location storing the test states of the interlock is reset at block 24A. It will be recognized that the memory location for a single interlock may be reset or the memory location for all interlocks may be reset. Next, the barrier guard of the machine 11 is locked at block 24B and "interlock test on" indicators and devices are activated at block 24C. The indicators and devices may be located near the interlock, at the output device of the system, or both. The interlock function is also bypassed at block 24D so that the machine 11 will not be shut down when testing the interlock.

At block 24E, the interlock is retracted from the barrier guard by the test system and/or the barrier guard is moved or breached by the test system to perform the interlock test. The interlock is then tested a first time to determine whether the interlock has changed state as required. The control unit 14 then determines at block 24F whether the interlock passed the first test. If the interlock passed the test, the results of the test are recorded at a selected memory location associated with the interlock at block 24H and the process proceeds to block 24I. If the interlock failed the test, the results of the test are recorded at a selected memory location associated with the interlock at block 24G and the control unit determines whether to perform the original position test at block 24J. If the original position of the interlock is not to be tested because the interlock has already failed the first test, the "test failed" warning indicators and devices are activated at block 24K and the process proceeds to block 24L as further described below. The "test failed" indicators and devices may be located where desired, for instance, at the output device, near the interlock, or both. If the original position test is to be performed, the process proceeds to block 24I. Thus, while the failure of the interlock to pass the test when retracted from the barrier will be recorded, the interlock may also be tested, if desired, to see if it is operative when in its original position. This situation applies with respect to the sub-routines FIGS. 4, 4A and 4B and 5, 5A and 5B as well.

At block 24I, the interlock is moved after the completion of the first test by the test system to its original safeguarding position, and the barrier guard also returns to its original safeguarding position if it has been moved or breached to perform the first test. The interlock is then tested a second time to determine whether the interlock has returned to its original safeguarding state. At block 24M, the control unit 14 determines whether the interlock passed this second test. If the interlock failed the test, the results are recorded at a selected memory location associated with the interlock at block 24N. If the interlock passed the test, the results are recorded at a selected memory location associated with the interlock at block 24P.

The control unit 14 then determines at block 24Q whether the interlock passed all the tests. If the interlock did not pass all of the tests, the "test failed" warning indicators and devices are activated at block 24K. The interlock is then placed in maintenance standby at block 24L. As a result, the barrier guard remains locked and can only be opened by authorized personnel so that the interlock may be repaired or replaced. The interlock function remains in a bypass mode to allow the machine 11 to operate but the bypass can be removed by authorized personnel for interlock maintenance or other reasons. The control unit 14 then proceeds to block 24S as further described below.

If the interlock passed all of the tests at block 24P, the interlock function is reinstated (i.e., remove bypass) at block 24T so that the machine 11 will shut off when the barrier guard is breached. "Test passed" indicators and devices are also activated at block 24U, and the barrier guard is unlocked at block 24V. The process then proceeds to block 24S.

At block 24S, the control unit 14 then determines whether the last interlock has been tested. If another interlock needs to be tested, the control unit 14 will test the next interlock beginning at block 24A. If all of the interlocks have been tested, the "interlock test on" indicators and devices are deactivated at block 24W. The control unit 14 then returns the process to the main routine 22 at block 22R.

Figure 4:
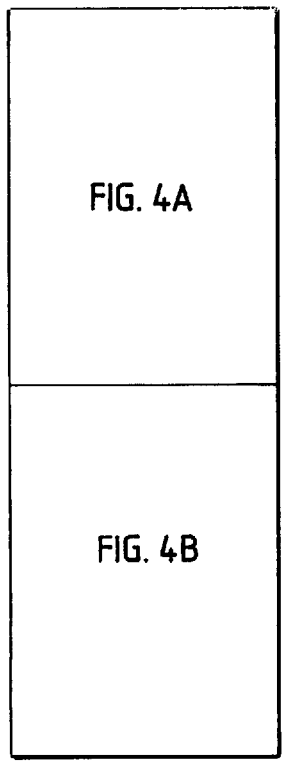
Figure 4A:
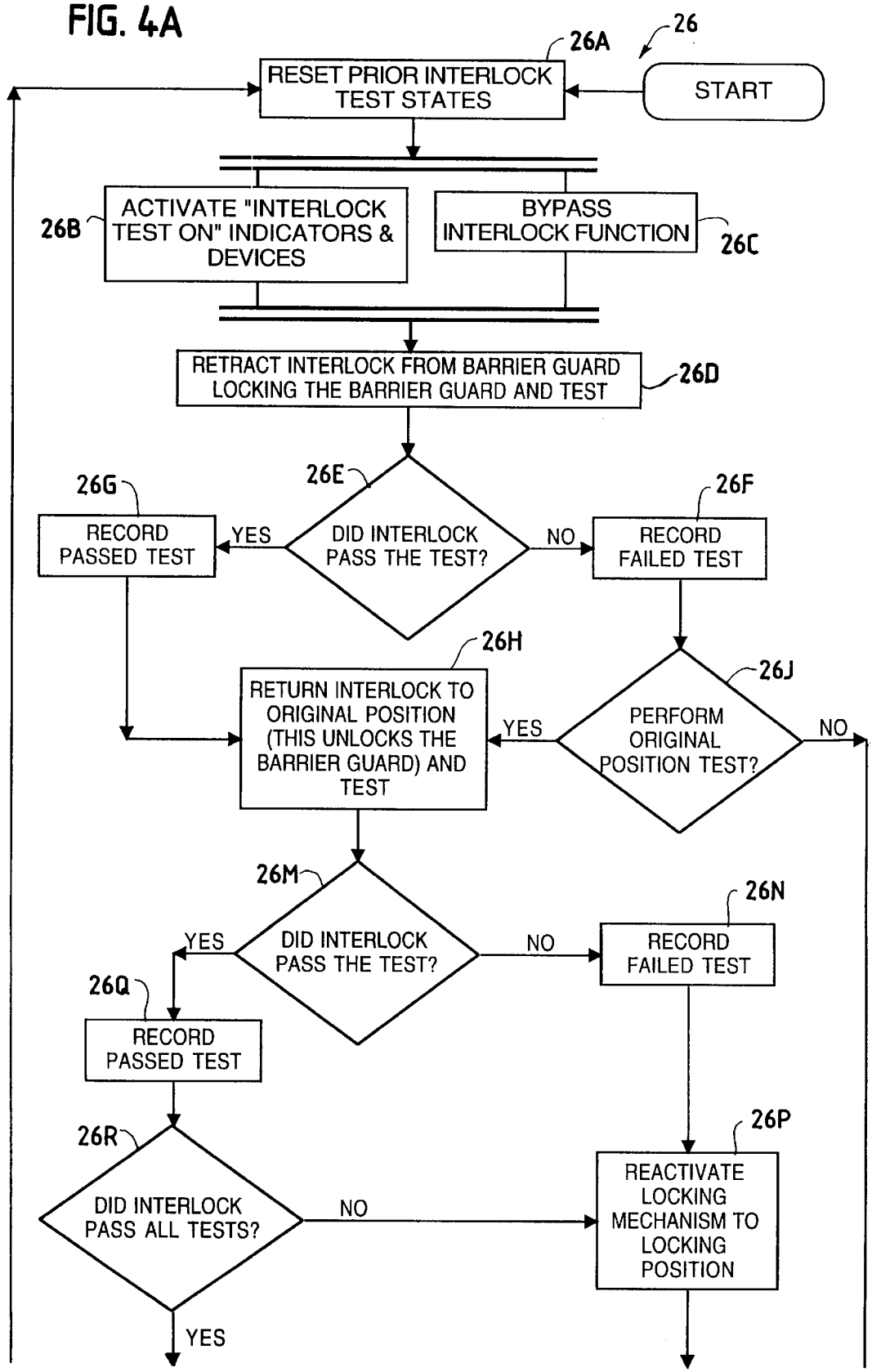

The second sub-routine 26 of the interlock test routine is schematically illustrated in FIGS. 4, 4A and 4B and includes the capability of bypassing the barrier guard interlock function of the machine 11 so that the machine 11 will not shut down when the interlock is tested. The second sub-routine 26 will also activate a barrier guard locking mechanism integral with the interlock testing device. For example, when the interlock is retracted from the barrier guard, a mechanical link automatically locks the barrier guard, and when the interlock is returned to its original position, the barrier guard is automatically unlocked. (See detailed description hereinafter with respect to FIGS. 20–22.)

When the second sub-routine 26 is executed, the memory location storing the test states of the interlock is reset at block 26A. It will be recognized that the memory location of a single interlock may be reset or the memory locations for all of the interlocks may be reset. "Interlock test on" indicators and devices are then activated at block 26B. The interlock function is also bypassed at block 26C so the machine 11 will not be shut down when testing the interlock.

At block 26D, the interlock is retracted from the barrier guard by the test system and/or the barrier guard is moved or breached by the test system to perform the interlock test. The barrier guard is automatically locked by the integral locking device. The interlock is then tested a first time to determine whether the interlock has changed state as required. The control unit 14 then determines at block 26E whether the interlock passed the first test. If the interlock passed the test, the results of the test are recorded at a selected memory location associated with the interlock at block 26G and the process proceeds to block 26H. If the interlock failed the test, the results of the first test are recorded at a selected memory location associated with the interlock at block 26F and the control unit determines whether to perform the original position test at block 26J. If the original position test is not to be performed, "test failed" warning indicators and devices are activated at block 26K and the process proceeds to block 26L. If the original position test is to be performed, the process proceeds to block 26H.

At block 26H, the interlock is moved at the completion of the first test by the test system to its original safeguarding position, and the barrier guard also returns to its original safeguarding position if it has been moved or breached to perform the first test. These actions also unlock the barrier guard because of the nature of the integral locking device design. The interlock is then tested a second time to determine whether the interlock has returned to its original safeguarding state. The control unit 14 then determines at block 26M whether the interlock passed this second test. If the interlock failed the test, the results are recorded at a selected memory location associated with the interlock at block 26N and the process proceeds to block 26P. If the interlock passed the test, the results are recorded at a memory location associated with the interlock at block 26Q. The control unit 14 then determines at block 26R whether the interlock passed all of the tests. If the interlock did not pass all of the tests, the process proceeds to block 26P.

At block 26P, the locking mechanism is reactivated to a locking position and the "test failed" warning indicators and devices are activated at block 26K. The interlock is then placed on maintenance standby at block 26L. As a result, the barrier guard remains locked and can only be opened by authorized personnel so that the interlock can be repaired or replaced. The interlock function remains in bypass mode to allow the machine 11 to operate but the bypass can be removed by authorized personnel for interlock maintenance or other reasons. The process then proceeds to block 26S.

If the interlock passed all of the tests at block 26R, the interlock function is reinstated (i.e., remove bypass) at block 26T so the machine 11 will shut off when the barrier guard is breached. The "test passed" indicators and devices are also activated at block 26U. The process then proceeds to block 26S.

At block 26S, the control unit determines whether the last interlock has been tested. If the last interlock has not been tested, the control unit 14 then tests the next interlock beginning at block 26A. If the last interlock has been tested, the "interlock test on" indicators and devices are deactivated at block 26V. The control unit 14 then returns the process to the main routine 22 at block 22R.

Figure 5:
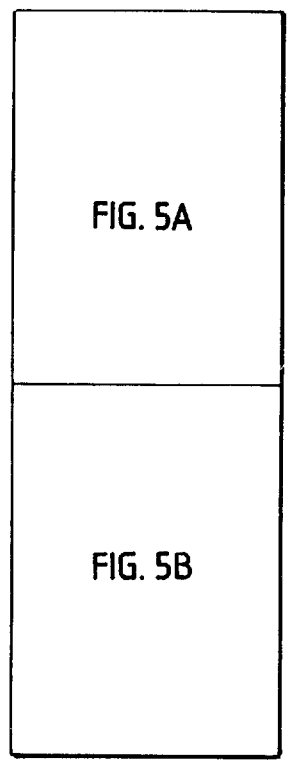
FIGS. 5, 5A and 5B illustrate another subroutine of the main routine of FIG. 2 to carry out testing of interlocks.
Figure 5A:
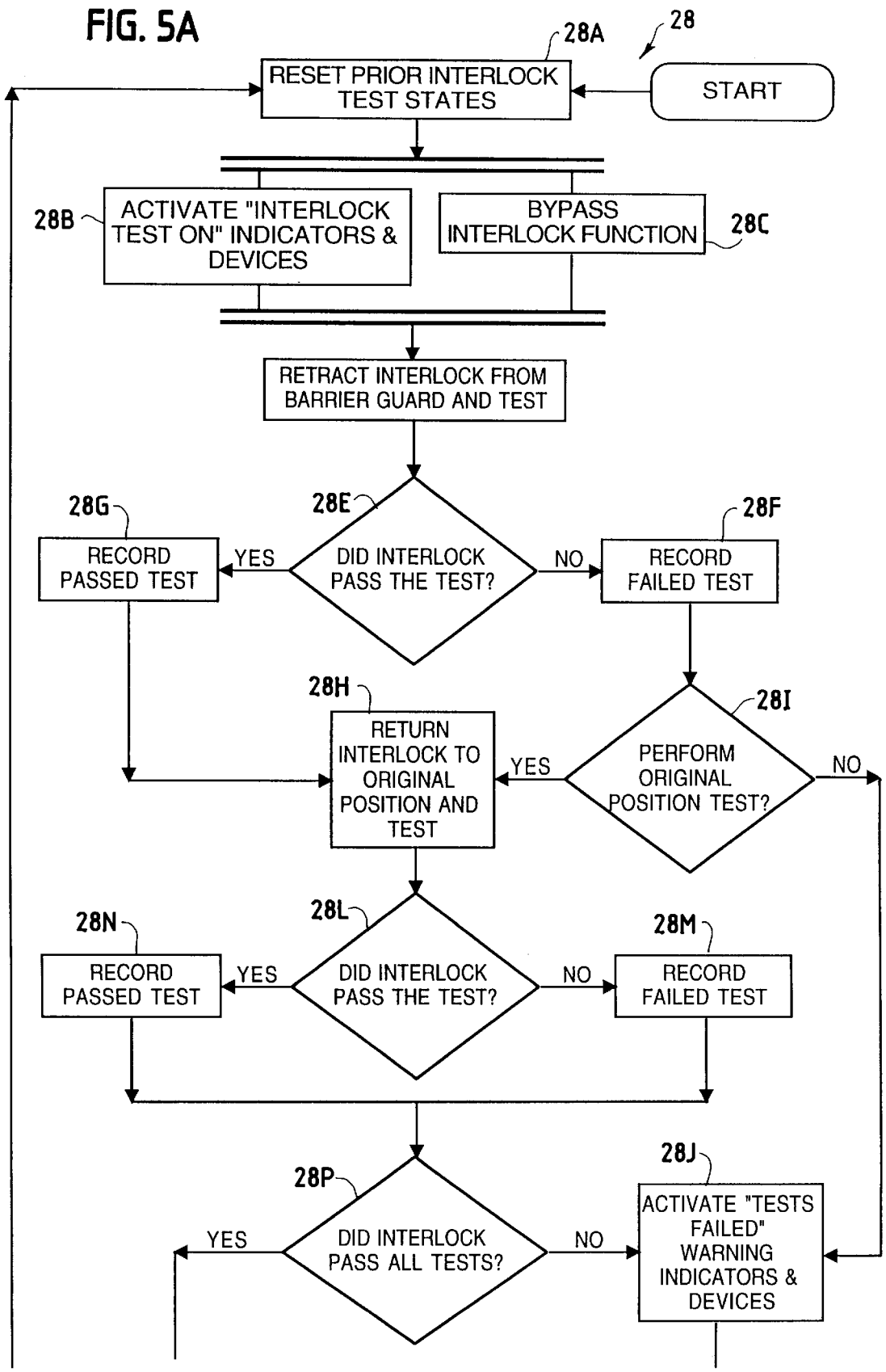
Figure 5B:
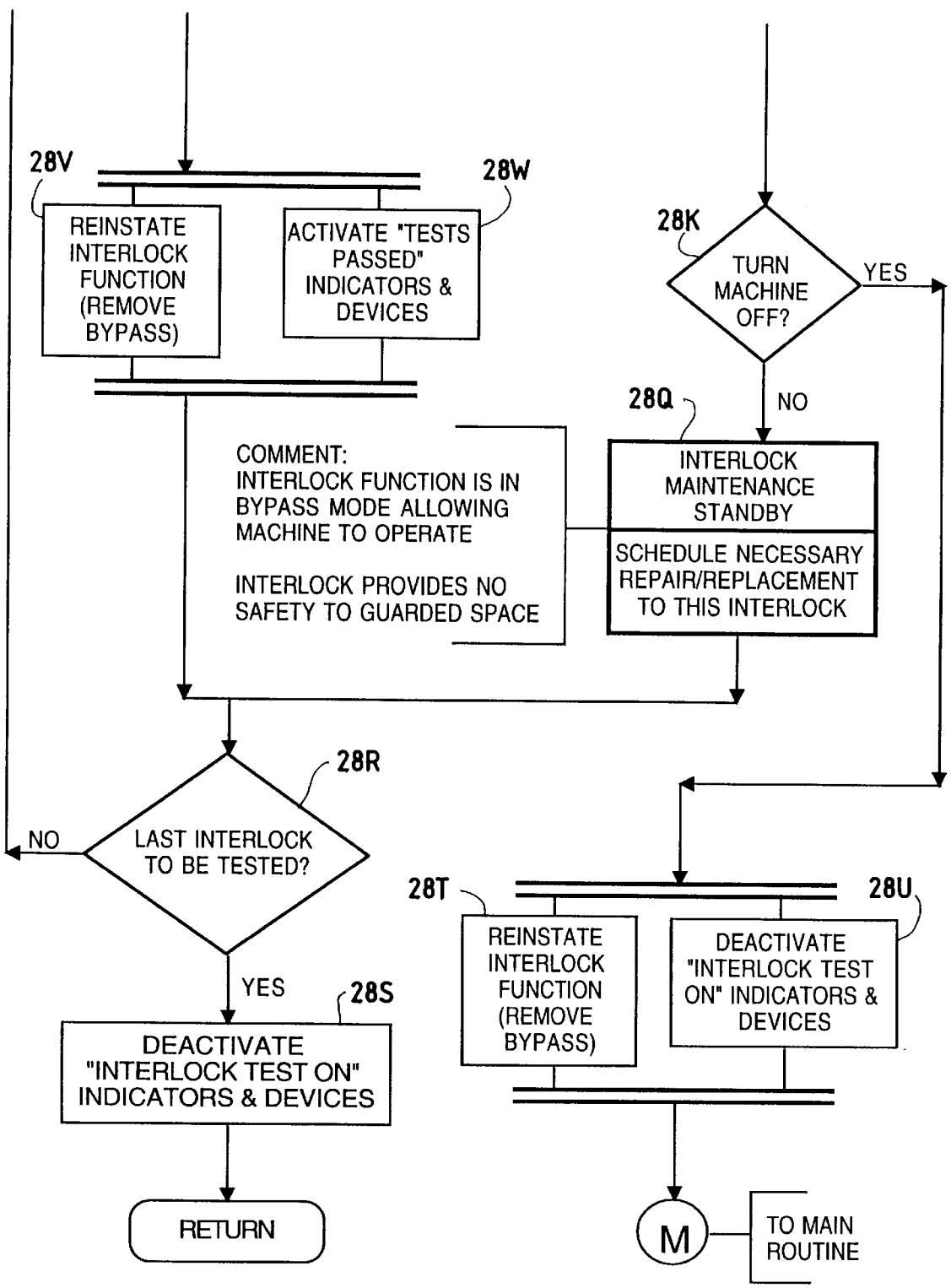

The third sub-routine 28 of the interlock test routine illustrated in FIGS 5, 5A and 5B includes the capability of bypassing the barrier guard interlock function of the machine 11 so that the machine 11 will not shut down when the interlock is tested, but does not activate a barrier guard locking device. When sub-routine 28 is initiated, the memory location storing the test states of the interlock is reset at block 28A. It will be recognized that a memory location for a single interlock may be reset or the memory locations of all of the interlocks may be initially reset.

At block 28B, "interlock test on" indicators are activated. The interlock function is also bypassed at block 28C so that the machine 11 will not shut down when testing the interlock. At block 28D, the interlock is then retracted from the barrier guard by the test system and/or the barrier guard is moved or breached by the test system to perform the interlock test. The interlock is then tested a first time to determine whether the interlock has changed states as required. The control unit 14 then determines at block 28E whether the interlock passed the first test. If the interlock passed the test, the results are recorded at a selected memory location associated with the interlock at block 28G and the process proceeds to block 28H. If the interlock failed the test, the results are recorded at a selected memory location associated with the interlock at block 28F and the control unit 14 determines whether to perform the original position test at block. If the original position test is not performed, "test failed" warning indicators and devices are activated at block 28J and the process proceeds to 28K as further described below. If the original position test is to be performed, the process proceeds to block 28H.

At block 28H, the interlock is returned after completion of the first test by the test system to its original safeguarding position, and the barrier guard also returns to its original safeguarding position if it has been moved or breached to perform the first test. The interlock is then tested a second time to sense whether the interlock has returned to its original safeguarding state. The control unit 14 determines at block 28L whether the interlock passed this second test. If the interlock failed the second test, the results are recorded at a memory location associated with the interlock at block 28M and the process proceeds to block 28P. If the interlock passed the test, the results are recorded at a memory location associated with the interlock at block 28N and the process proceeds to block 28P.

At block 28P, the control unit 14 then determines whether the interlock passed all of the tests. If the interlock did not pass all of the tests, the "test failed" warning indicators and devices are activated at block 28J and the control unit determines whether to turn the machine off at block 28K. If the machine 11 is not to be turned off, then the interlock is placed on maintenance standby at block 28Q. The interlock function remains in a bypass mode to allow the machine 11 to operate, but the interlock provides no safety to the guarded space if the barrier guard has not been previously locked, or if locked, can be opened without safety authorization. The bypass can be removed by authorized personnel for interlock maintenance or other reasons. The process then proceeds to block 28R as further described below.

If the machine 11 is to be turned off per instruction of block 28K, the interlock function is reinstated (i.e., remove bypass) at block 28T, the "interlock test on" indicators and devices are deactivated at block 28U and the sub-routine 28 returns to location M of the main routine 22.

If the interlock passed all of the tests at block 28P, the interlock function is reinstated (i.e., remove bypass) at block 28V so the machine 11 will shut down when the barrier guard is breached. The "test passed" indicators and devices are also activated at block 28W. The process then proceeds to block 28R.

At block 28R, the control unit 14 determines whether the last interlock has been tested. If the last interlock has not been tested, the control unit 14 tests the next interlock starting at block 28A. If the last interlock has been tested, the "interlock test on" indicators and devices are deactivated at block 28S. The control unit 14 then returns the process to the main routine 22 at block 22R.

Described hereinafter are various testing mechanisms and interlock constructions that are suitably modified to become a functional part of applicant's novel interlock testing system schematically illustrated in FIG. 1. The added features of the interlock arrangements enable them to be used during an automatic testing phase in conjunction with the aforementioned control unit. Additionally, there are a number of embodiments that lend themselves to manual and/or automatic testing. The modified interlocks illustrated and described are merely intended to be examples of what has to be done to existing interlocks and new interlock designs to enable them to be part of a system for testing interlocks. Applicant's inventive testing system can be used with essentially all interlock arrangements that employ a change of state to register the functional aspects of the interlock, which change of state is sensed to test an interlock.

Figure 6:
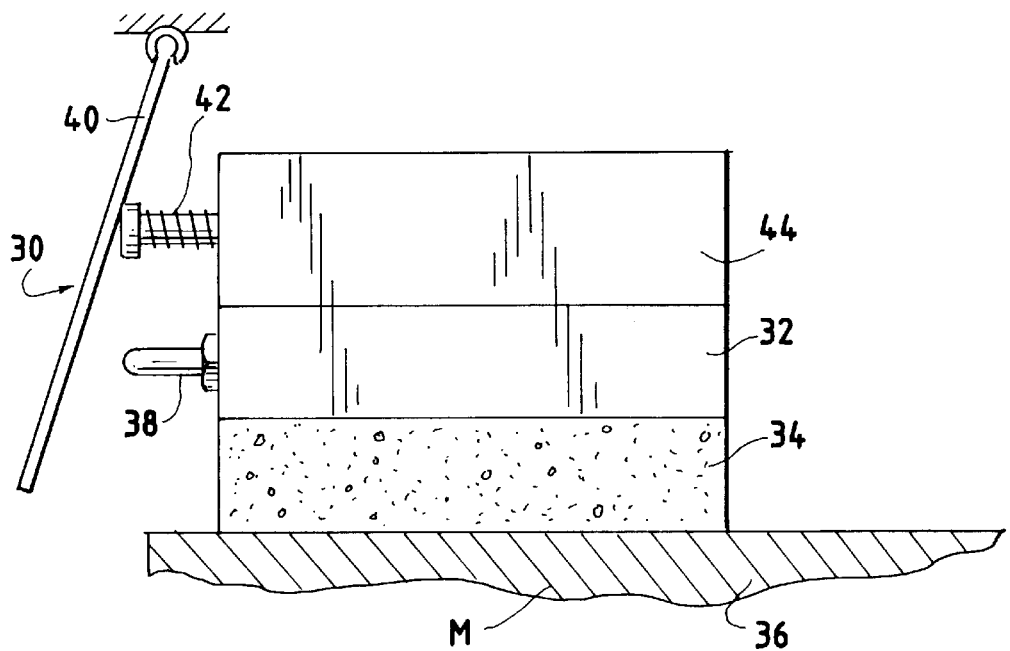

Referring now to FIG. 6, there is illustrated an interlock mechanism 30 which lends itself very well to being used in an automatic testing system of the type shown in FIG. 1. This mechanism 30 consists of a pushbutton type limit switch 32 secured to a rubber mount 34 that is affixed to a machine bed 36 which is part of a machine M. The limit switch 32 includes a pushbutton 38, the outward movement of which acts to turn off the machine when the hinged guard 40 is moved away from the interlock 30, which guard is protecting a hazardous space of the machine M. Essentially, the limit switch 32 is part of circuitry wherein the switch 32 is normally biased into an open position to open a circuit to shut off the machine, but is held closed by the guard 40 when in its closed position. Thus, when the guard 40 is opened or the switch is spaced from the guard by the motorized screw 42 of the pusher unit 44 and the pushbutton 38 functions properly by moving outwardly, the interlocks will open the circuit to shut down the machine M. This constitutes the first phase of the test cycle. The second phase of the test cycle completes the test and consists of the motorized screw 42 of the pusher unit 44 retracting and allowing the guard 40 to close and restore the pushbutton 38 of the interlock limit switch 32 to its original guarding state and the control unit checking if the interlock circuit functions as required in the restored state. The type of switch in this embodiment is referred to as being in the "normally open" position (off) and held closed (on) when the guard is in place. It is noted that in this embodiment, if the switch malfunctions to remain closed, the machine M will continue to operate. In this embodiment, as well as the others, where a guard is opened during testing, provision is made to insure that the guard will close after the testing is completed.

To avoid repetition, the second phase of the test cycle will generally not be described in the remaining embodiments of the interlock test arrangements. However, it is to be understood that the two-phase test cycle approach with the second phase consisting of restoring the interlock to its original guarding state and checking for proper function, is to be used with any interlock test system unless otherwise desired.

As aforementioned, if the testing process is to occur without shutting the machine down, the control unit monitoring the circuits containing the interlocks will be set to bypass the machine shutdown of each interlock when it is being tested and then effect actuation of the interlock as if the space guarded thereby has been breached. To avoid repetition, it is to be assumed that the testing system is set up to bypass the interlocks during the testing phase when desired with any particular interlock arrangement.

Figure 7:
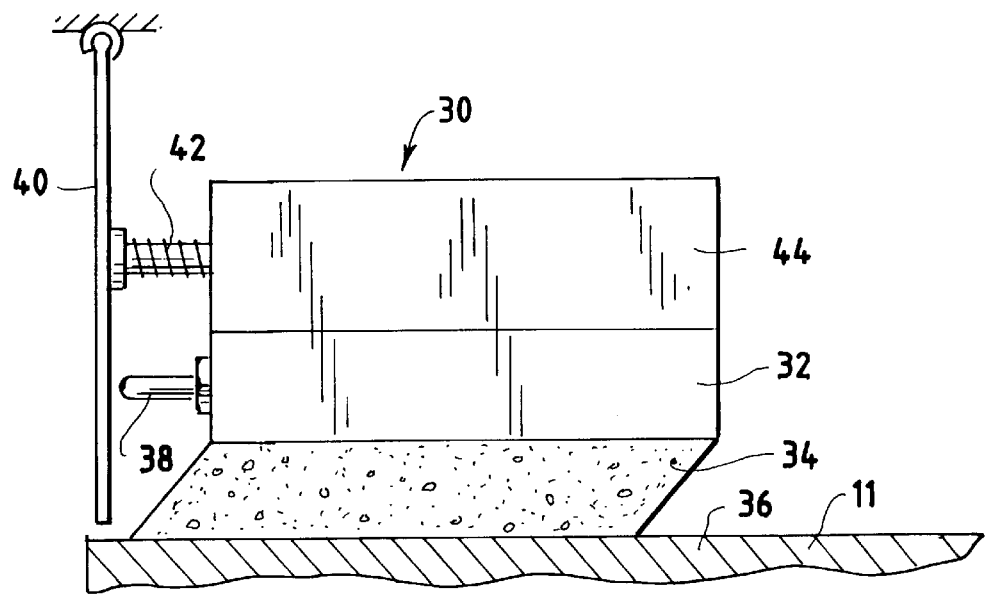

The embodiment of FIG. 6 can also be tested if the guard 40 is stuck or locked in position as shown in FIG. 7. As before, the pushbutton limit switch 32 and motorized screw 42 are secured to machine bed 36 through an intermediate rubber mount 34. When the screw 42 engages the stuck guard 40, the reaction force imposed by the screw 42 moves the tester pusher unit 44 containing screw 42 away from the guard, carrying along with it the limit switch 32, which movement is facilitated by the rubber mount 34 as shown in FIG. 7. In this position, the pushbutton 38 is free of guard 40 and is free to move to test the operation of the interlock 30.

Figure 8:
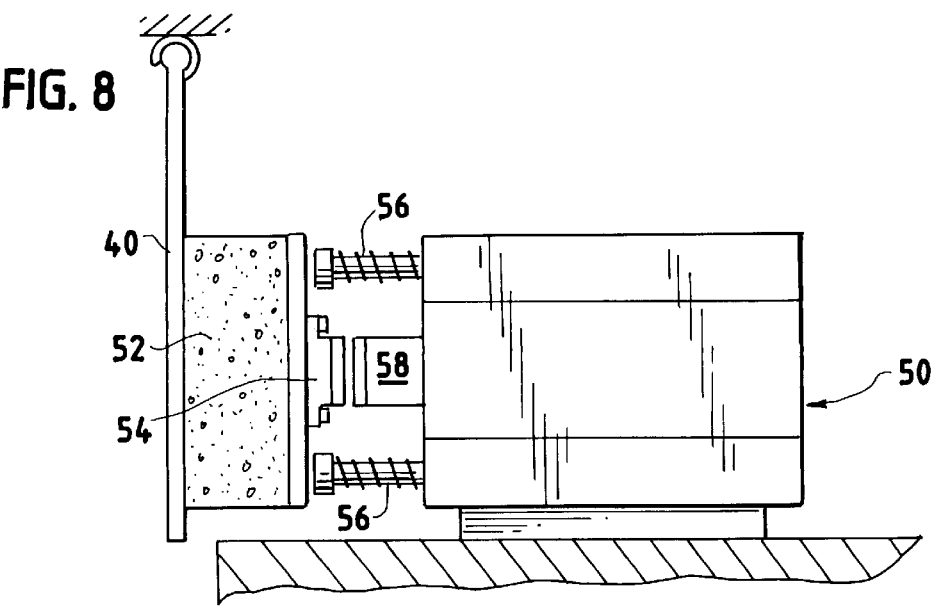

Another modified interlock that will function as a part of applicant's novel testing system is shown in FIG. 8, which functions in a manner comparable to the embodiment of FIGS. 6 and 7 in conjunction with a program unit as described in FIG. 1. In place of the limit switch of FIG. 6, there is employed a magnetic interlock 50 which has a number of components similar to that disclosed in FIGS. 6 and 7. In this design, a resilient mount 52 is affixed to the guard 40 and connected to the resilient mount 52 is a portion 54 of the magnetic interlock 50. During the testing phase, if the guard 40 can open as, for instance, if it is hinged, the plunger of the tester pusher units 56 moves the guard 40 away to separate magnetic interlock portions 54, 58 which varies the magnetic field to turn off the machine and thus test the operation of the interlock. In the event the guard 40 does not move, the resilient mount 52 will be compressed to separate the magnetic interlock portions 54, 58 and thus permit testing of the magnetic interlock.

Figure 9:
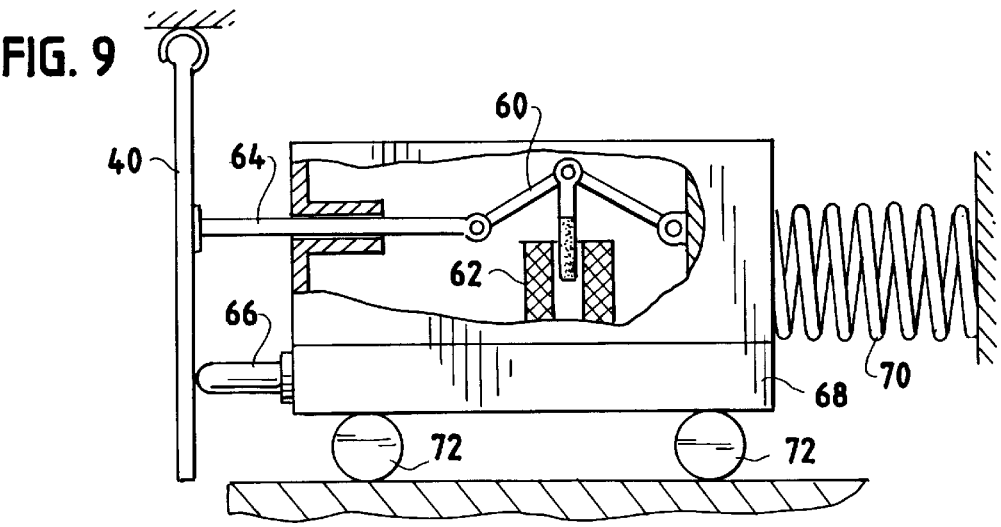

Another modified interlock construction used in applicant's testing system that functions in a manner similar to the embodiments illustrated in FIGS. 6 and 8 is shown in FIG. 9. This interlock uses as the tester mechanism a toggle mechanism 60 that is operated by a solenoid 62 when the interlock is to be tested and a spring 70. Connected to the end of the toggle mechanism 60 is a plunger 64 that acts like the motorized screw of FIG. 6 and the pusher units 56 of FIG. 8. If the guard 40 moves in the opening direction, the pushbutton 66 of the interlock limit switch 68 will be free to open the machine operating circuit or not, depending on its integrity. In the event the guard 40 is stuck, the interlock switch 68 will move back against the action of the spring 70, which movement is facilitated by the rollers 72 moving on the machine bed 36.

Figure 10:
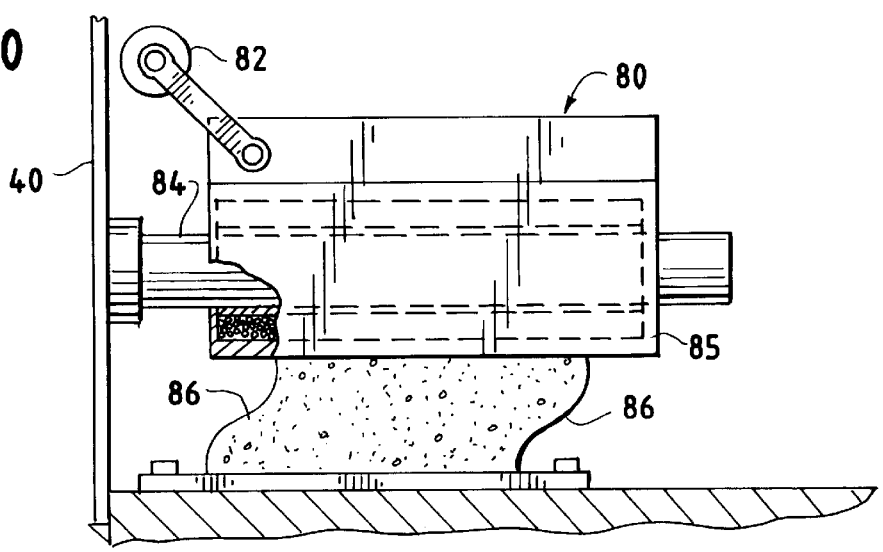

In FIG. 10, there is shown a design of interlock which is part of a test system that operates in a manner similar to those in FIGS. 6–9. In this arrangement, the interlock unit 80 includes a roller assembly 82 that is connected to a switch located in the interlock unit and is comparable to the pushbutton 38 in FIG. 6. The interlock unit 80 is connected to a solenoid actuated plunger 84 assembly that is part of the test mechanism that engages the guard 40. The plunger 84 is in engagement with guard 40 and is located in the pusher unit 85 mounted on a pair of flat springs 86 both of which are part of the test mechanism. Therefore, if the guard is stuck, the pusher and interlock units are free to move away from the guard to permit testing of the interlock.

In place of the resilient mounts employed in the embodiments of FIGS. 6 and 8, the rollers of FIG. 9 or the springs of FIG. 10, the interlock embodiment of FIG. 11 that can be part of the test system, uses an actuator such as the linear actuator 90. The linear actuator is by way of example only, since rotary actuators can be used or any other appropriate actuator design. In this embodiment, the actuator 90 includes a shaft 92 that is connected by a test arm 94 to an interlock sensor 96 having a pushbutton 98 extending therefrom. When the actuator shaft 92 is moved as shown in FIG. 12 by the programming of the control unit, the interlock sensor 96 is moved away from the guard and the pushbutton 98 is free to move to test the integrity of the interlock without opening the guard 40.

In the previous embodiments, the interlock mechanisms have employed switches that are disposed in the normally open position (machine off) and held in their closed position (machine on) by their respective guard. There are other arrangements in which the interlock switching arrangements are disposed in a normally closed position (machine on) and held open (machine off) by the guard when in an open position. This type of interlock design has the advantage that if the switch does not move to its closed position after the guard is closed, the machine will remain off, indicating its malfunction.

In FIG. 13, there is shown an interlock arrangement used in conjunction with a sliding guard barrier 100. In this design, the switch in sensor 102 is in the closed position (machine on) when the guard is fully closed. When the guard is opened, as shown in FIG. 13A, the switch in sensor 102 is moved to the circuit open position to turn the machine off. To use this interlock as part of a testing system, the actuator shaft 103 of actuator 104 is connected through a test arm 106 that contacts a collar 112 affixed to a sensor arm 108. As illustrated in FIG. 13, when the guard 100 is closed, the sensor arm is biased into guard recess 110.

When the interlock sensor is to be tested, the actuator shaft 103 is moved by the linear actuator 104 to the position shown in FIG. 14 moving thereby the arm 106 against the collar 112 on arm 108. When this movement is accomplished and the interlock sensor opens the circuit, the interlock is acting properly and if not, the interlock has failed. FIG. 13A shows the guard in a partially open position wherein the sensor arm 108 has been moved by the guard barrier 100 to move the interlock to an open position comparable to the position it is moved to during testing.

Figure 15:
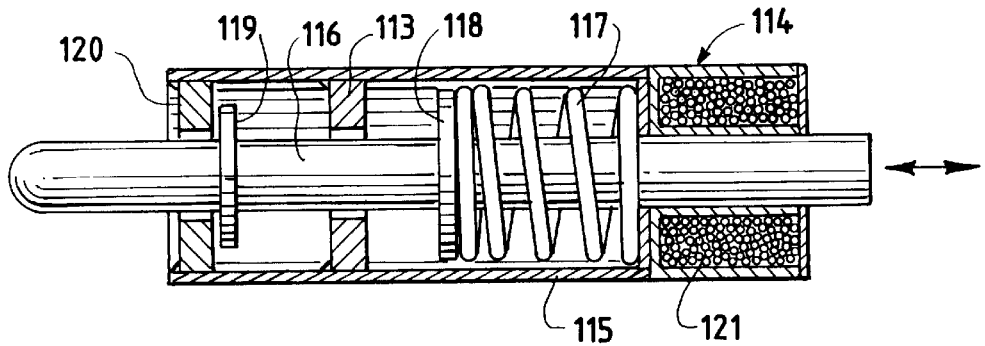

In FIG. 15, there is illustrated a relay type interlock where the interlock sensor arm and the interlock test actuator are the same mechanism member 116. The relay type interlock 114 consists of a housing 115 in which is located the actuator 116. The actuator 115 is biased by compression spring 117 acting against ring 118 secured to the actuator 116 to which is also secured contact ring 119 which butts against contact pad 120 to place the switch in the normally closed position (machine on) in much the same manner as sensor arm 108 in FIG. 13. The housing 115 also contains a second sensor contact pad 113 secured to the housing 115, and utilized during testing of the interlock. In FIG. 15, the interlock is shown in its normally closed position (machine on). In normal interlock operation, the guard, when opened, will slid across the end of the sensor/actuator 116 in the manner illustrated in FIG. 13A, pushing the contact ring 119 away from the contact pad 120, putting the interlock in the open position (machine off). For testing, the control unit will institute the testing procedure, actuating the solenoid 121 pulling the contact ring 119 away from the contact pad 120 and closing the contact ring 119 onto contact sensor pad 113.

This places the interlock in the open position, while at the same time indicating that the test mechanism has performed its opening test function. As can be appreciated, if the actuator 116 stays depressed and does not return to its extended state after testing, the interlock remains in the machine off position signaling an interlock or tester failure.

In certain situations, it may be desirable to provide for on-the-spot manual testing to determine if the interlocks are functioning properly before the guards are opened. Such manual testing arrangements may or may not be in addition to remote testing capability with the use of a control unit. It is to be noted that while some provision could be made for bypassing the interlock during manual testing, the usual result would be to turn off the machine when the guard is moved or breached.

Figure 16:
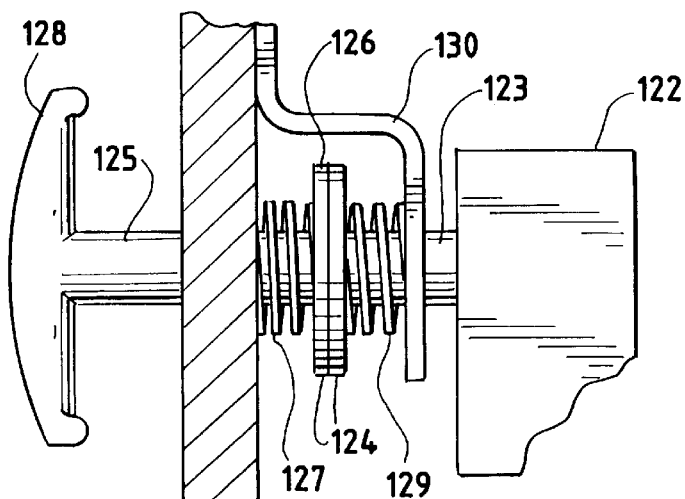

FIG. 16 discloses an interlock 122 that can comprise a normally open held closed switch as shown in FIGS. 6 and 8 or a normally closed held closed switch such as shown in FIGS. 13, 14 and 15. The interlock 122 includes a pushbutton actuator 123 to which is connected disc 124. The actuator 123 is held in the position shown by a plunger 125 passing through a hole (not shown) in the guard 40 to which is connected a disc 126 that is biased against the disc 124 by spring 127 located between disc 126 secured to plunger 125 and guard 40. With the interlock being of the normally open held closed type the interlock 122 is manually tested by pulling the plunger handle portion 128 and connected disc 126 to the left away from the interlock 122 against the action of the spring 127. In this case, it is not necessary to open the guard 40 since pulling the plunger 125 and disk 126 away from the interlock allows the actuator 123 to change its state to shut off the machine and thus be tested to see if it is operating properly. Spring 127 restores the actuator to its original closed position after the handle 128 is released. As previously mentioned, the interlock 122 could be constructed so that in addition to on-the-spot manual testing, it can be remotely tested in the manner discussed with respect to the FIG. 6, 8, etc., embodiments. This manual system can also be used with a normally closed held closed switch providing a spring 129 similar to spring 127 between disc 124 and bracket 130 secured to guard 40. Bracket 130 includes a hole (not shown) through which actuator 123 freely extends. Thus, to test a switch in the normally closed held closed position, the handle 128 is pushed in the direction of the guard 40, which pushes the actuator 123 inwardly to its open position by engagement with disc 124. Spring 129 restores the actuator to its original closed position after the handle 128 is released.

Figure 17:
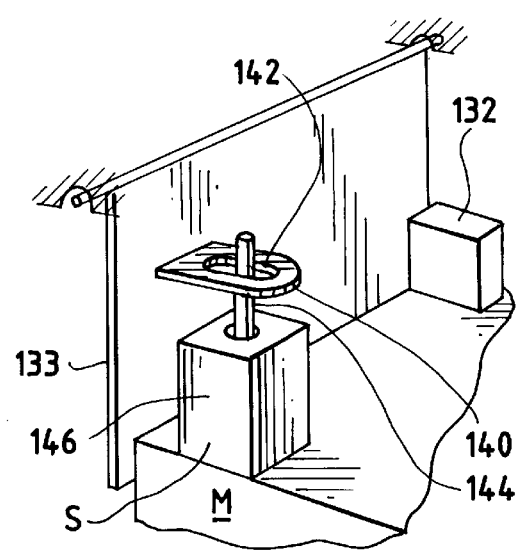

Referring now to FIG. 17, there is shown an interlock mechanism schematically illustrated by the box 132. Examples of interlocks that box 132 could represent include those shown in FIGS. 6, 8, 9, 10, etc. When using one of those embodiments, the interlocks can be remotely tested by employing the systems previously discussed with respect thereto. In the FIG. 17 embodiment, the interlock 132 can be remotely or manually tested on site by the employment of a latch arrangement or suitable stops (not shown) permitting a limited predetermined pivotal movement of guard 133 away from the interlock 132. The guard movement would be only that predetermined limited amount necessary to test the interlock as it normally would be activated by opening the guard, but not sufficient to expose the operator to potential injury.

FIG. 17 illustrates a latch plate 140 having an opening slot 142 that receives a bolt 144 controlled by a solenoid operated mechanism 146. With the bolt 144 located in the slot 142, the limited travel of the guard is defined by the length of slot 142. The solenoid 146 is activated at the time the interlock is to be tested which only permits limited movement of the guard during testing by introducing bolt 144 into slot 142 in latch plate 140. If remote testing is being used, the control unit in the test system will be set so that if the interlock fails during the test, the bolt 144 will remain in place, thus preventing the guard from being opened to permit full access. A suitable key will be necessary to disengage the bolt, which key will be only available to an authorized person to permit the bolt to be removed from slot 142 and the guard 133 to be fully opened.

Figure 18:
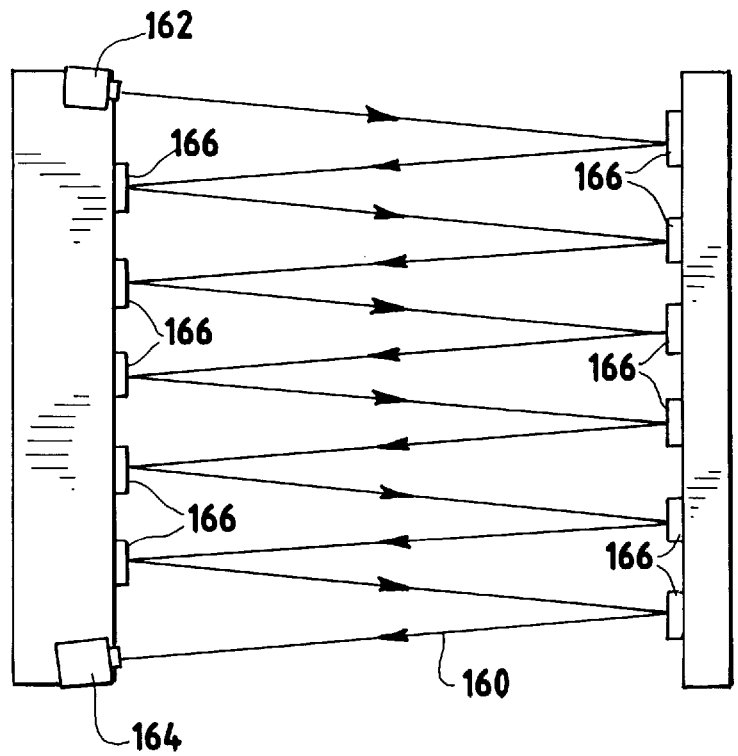
Figure 19:
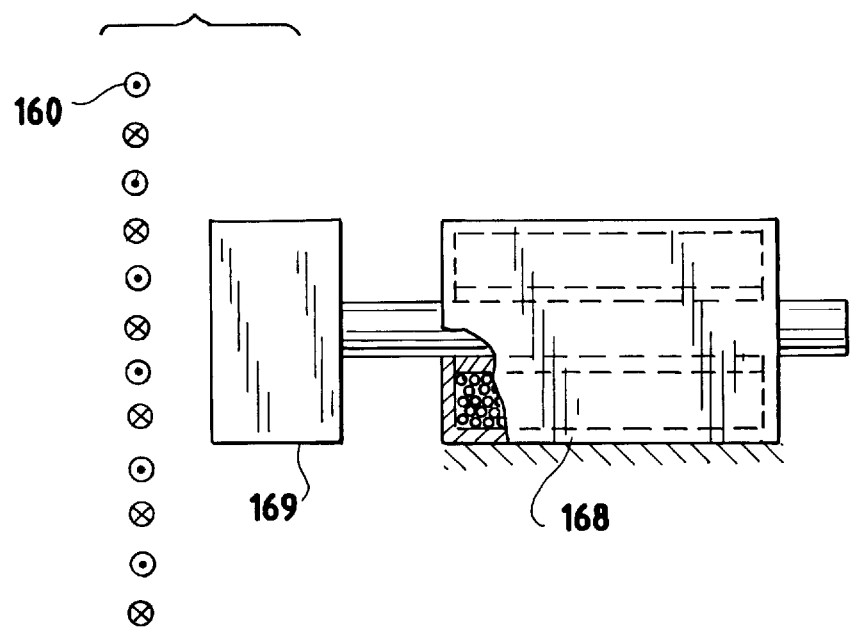

Another interlock embodiment that can be manually tested or remotely tested in conjunction with a control unit is disclosed in FIG. 18. This embodiment employs a light curtain 160 generated by an emitter 162 that forms the light curtain by directing a beam to a receiving sensor 164 via reflecting mirrors 166. When the curtain 160 is breached, the light path changes shading some of the mirrors 166 changing thereby the state of the light receiving sensor 164. Automatic testing can be accomplished by actuating the schematically illustrated solenoid 168 activated probe 169 inserted into the light path of the curtain 160 that would be tied into the system of the type disclosed in FIG. 1. Manual testing can be done with manually inserting a similar probe 169 into the light path or by merely breaching the curtain with one's hand.

Figure 20:
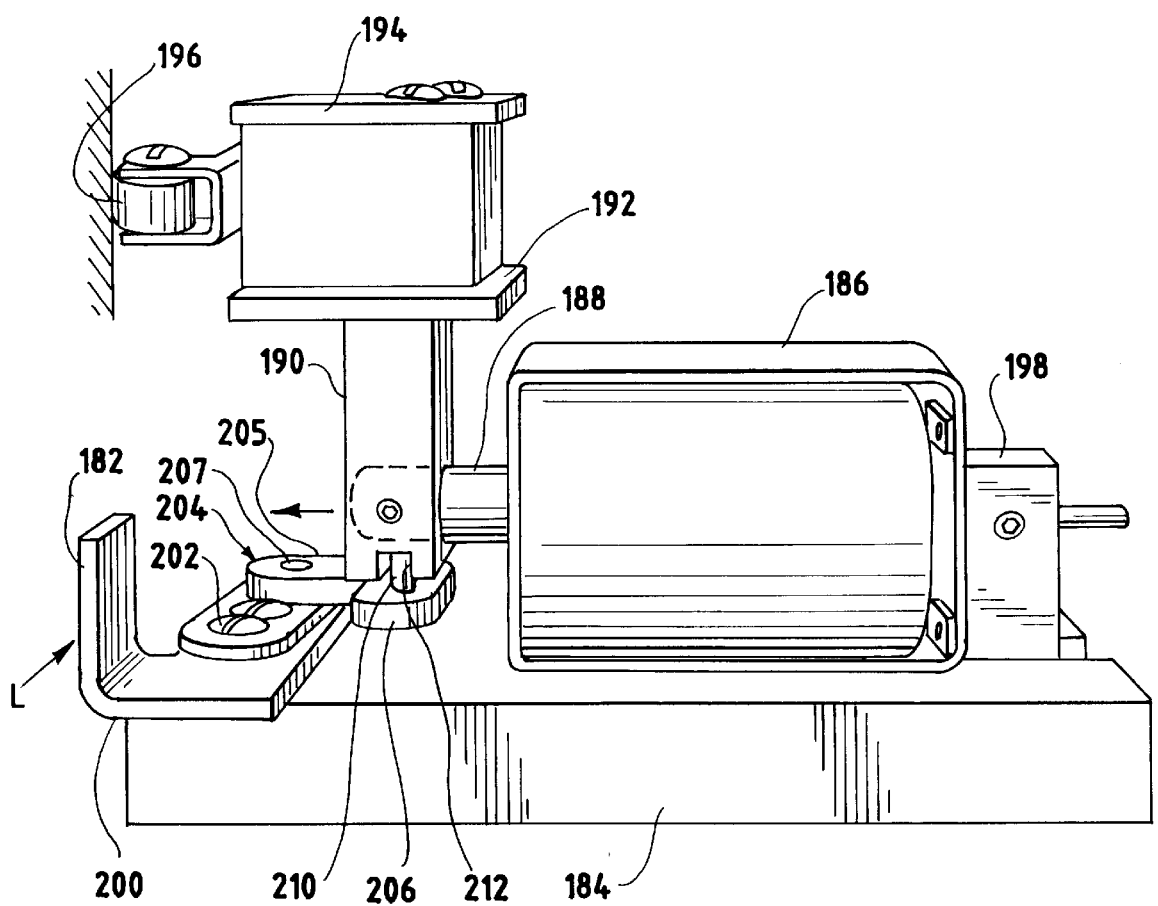
FIG. 20 is a side view of a linear actuator testing mechanism with a mechanically linked barrier guard locking device.
Figure 21:
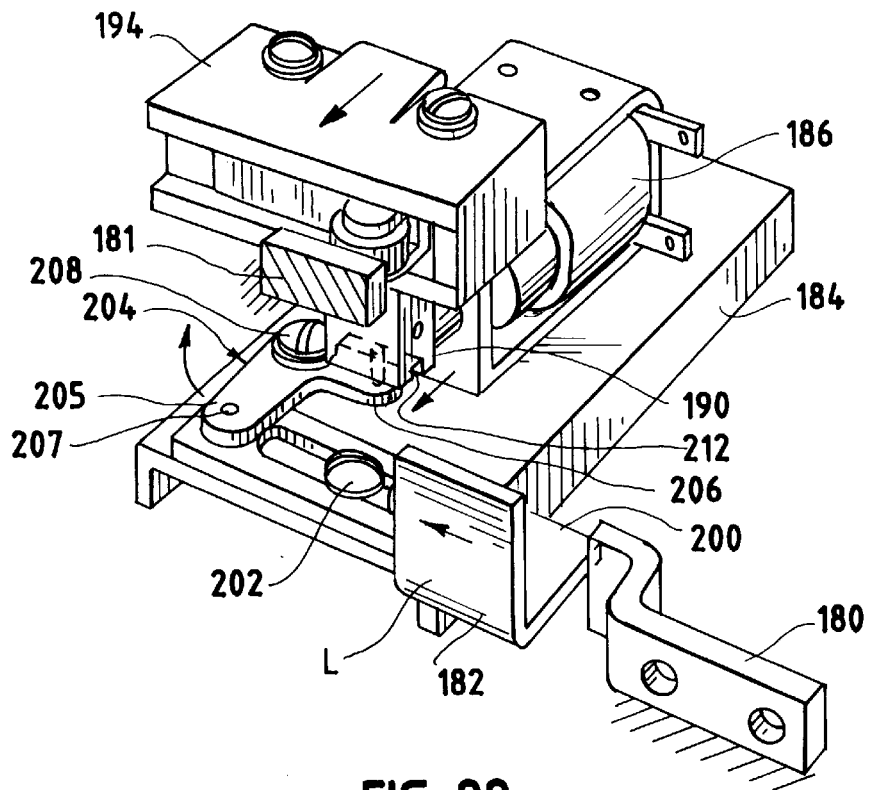
FIG. 21 is a perspective view of the apparatus of FIG. 20 showing the lock disengaged from the barrier guard.
Figure 22:
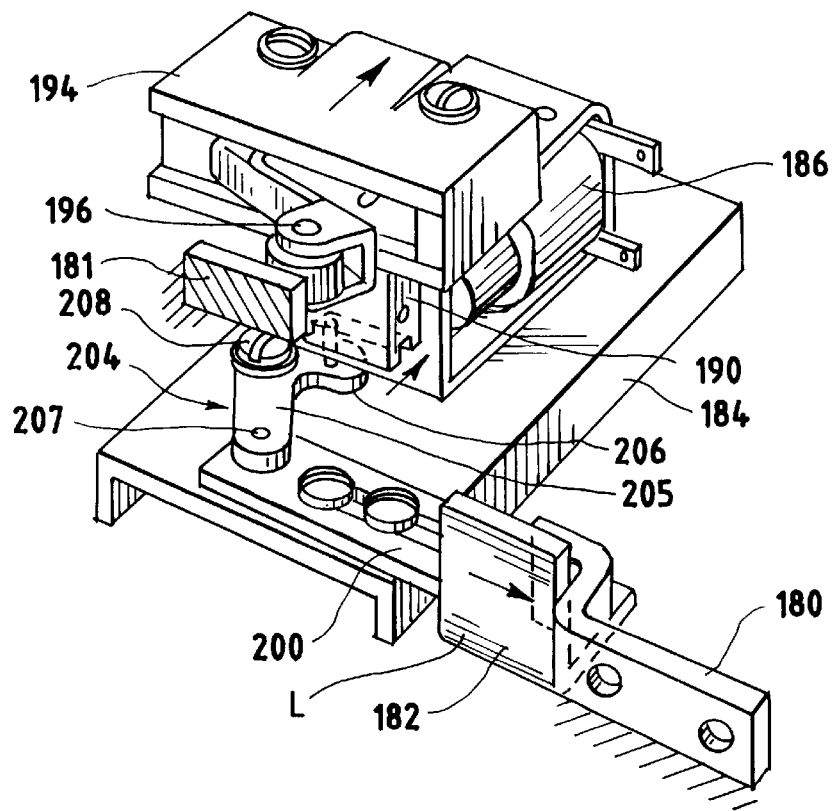
FIG. 22 is a view similar to FIG. 21 with the lock in engagement with the barrier guard.

Turning now to FIGS. 20–22, there is shown a mechanism similar to that disclosed in FIGS. 11 and 12 employing a linear actuator system for testing an interlock. The mechanism shown in FIGS. 20–22 illustrates the use of a linear actuator system to test an interlock that during the testing mode also actuates an integral locking mechanism 182 into engagement with a barrier guard latching member 180 to prevent the barrier guard 181 from being opened during the period that the interlock is being tested, and can be used to keep the barrier guard closed if the interlock has failed the test.

Essentially, this system consists of a mechanical arrangement whereby upon actuation of the linear actuator to test the interlock, a crank 204 is employed to move the locking member 182 into locking contact with the barrier guard latching member 180. This locking arrangement prevents access to the guarded space during the brief period the interlock is being tested. The assemblage also acts to keep the guard or barrier locked if the interlock fails the test and only permits it to be opened by an authorized person having the code or key to unlatch the guard for instance, for scheduled maintenance or repair. The lock engagement device is mechanically designed to be automatically actuated by the test mechanism to move a blade into locking engagement with the guard latching member 180 when the interlock is tested and to disengage the locking blade from the guard latching member 180 when the test is completed. This system and similar ones can be employed in conjunction with the subroutine of FIGS. 4, 4A and 4B which schematically illustrates the operating logic for the remote testing of interlocks in which the barrier guard locking mechanism is activated by and is integral with the test device.

FIG. 20 is a side view of the actuator mechanism shown in position in its normal position where it is located adjacent to a guard or barrier as illustrated in FIGS. 11 and 21. In FIG. 21, the locking member (lock engagement) blade 182 is shown out of engagement with the barrier or guard latching member 180. The locking member 182 is shown disposed in locking engagement with the barrier guard latching member 180 in FIG. 22.

Specifically, in FIG. 20, there is illustrated a base 184 on which is mounted the linear actuator 186. Extending from the linear actuator is the actuator shaft 188, at the front end of which is attached the cam block 190. The cam block 190 has attached to its upper end, the interlock test arm 192, to which is connected the interlock sensor 194 whose on/off sensor state is activated by the push lever arm 196. On the back end of the actuator shaft 188 is located a guide block 198 which limits the displacement and prevents rotation of the actuator shaft 188.

The guard lock engagement device includes a slide 200 which is integrally formed with the vertically disposed locking member 182 at its front end. The motion of the slide 200 which can glide freely on base 184 is controlled and restrained by the guide pins 202 mounted on the base 184. The back end of the slide 200 has a slot (not shown) which connects to arm 205 of the crank 204 via a slide pin 207 which is parts of the crank 204. The crank 204 pivots about the crank pin 208 (see FIG. 21) mounted on the base 184. The other arm 206 of the crank 204 has extending upward therefrom the cam pin 210 which is engaged with and moves along the cam slot 212 in block 190 in response to the movement of the cam block 190.

To test the interlock 194, the linear actuator 186 moves the shaft 188 in or out as required for each test phase imparting that motion to the cam block 190. The cam block 190 through the mechanism just described will move the slide 200 and its integral locking member 182 into locking engagement with the barrier guard latching member 180 when shaft 198 is retracted (FIG. 22) and out of locking engagement with the barrier guard when shaft 198 is moved outwardly (FIGS. 20 and 21).

Looking more specifically at the operation sequence in the position shown in FIG. 21, the lock engagement device is out of contact with the barrier guard latching member 180 and the crank arm 204 is positioned with the locking member in the retracted position. Upon rotation of the crank 204 through the action of the pin 207 in the slot (not shown), the slide 200 and its integral locking member 182 is moved to its extended position shown in FIG. 22 to engage the guard 180, thereby preventing the guard barrier from being opened during the test.

It is to be understood that by judiciously redesigning the components of the lock engagement mechanism just described the motion of the slide 200 and its locking member 182 can be made linear or rotary, or a combination of these two types of motions in a desired plane and direction. This flexibility allows for the design of different practical engagement modes between the mechanism's locking member 182 and the guard's latching member 180.

Employing the logic of. FIGS. 4, 4A and 4B if the interlock passes the test, the test system restores the interlock and the locking member to the position shown in FIGS. 20 and 21, thereby disengaging the locking member 182 from the guard or barrier latch. If the interlock fails the first test phase (retraction of the interlock), the actuator can be programmed to remain in its retracted state and lock the guard or barrier. If the second test phase fails (return of the interlock to its guarding position), the actuator can be programmed to retract the interlock again, thereby returning the locking member to the guard locking position keeping the guard or barrier locked. Thus, if the interlock fails either phase of the test, the guard or barrier can be kept locked to bar the access to the guarded space unless authorized.

It is intended to cover by the following claims all embodiments which fall within the true spirit and scope of the invention.

What is claimed is:

1. The method of testing a machine interlock and its circuit system consisting of a guard and an interlock mechanism including a sensing system responsive to a change of state to shut down a machine or to change the operating state of the machine if the guard is opened or breached comprising the steps of bypassing the interlock from the machine power or control circuit, changing the state of the sensing system and sensing such change of state to test the functioning of the interlock mechanism and its circuit system.

2. The method as set forth in claim 1 in which the guard is a structural barrier guard.

3. The method as set forth in claim 1 in which the guard is a non-structural barrier guard.

4. The method as set forth in claims 1, 2, or 3 in which the testing of the interlock and its system is done by a test device.

5. The method as set forth in claim 1 in which the testing of the interlock and its system is accomplished by a device that changes the relative position of the interlock mechanism with respect to the interlock sensor.

6. The method as set forth in claim 5 wherein the device causes the guard to move relative to a stationary interlock mechanism.

7. The method as set forth in claim 5 wherein the device causes the interlock mechanism to move relative to a stationary guard.

8. The method as set forth in claim 5 wherein the device causes the interlock sensor to move relative to a stationary interlock mechanism.

9. The method as set forth in claim 5 wherein the device causes the interlock mechanism to move relative to a stationary interlock sensor.

10. The method as set forth in any of claims 1–3 or 5–9 in which the testing of the interlock and its system is done by a testing system.

11. The method as set forth in claim 10 wherein the testing device and/or system is monitored to detect their failure.

12. The method as set forth in claim 11 wherein the failure of the interlock and/or its system, and/or the failure of the testing device and/or its system are detected as undifferentiated failures.

13. The method as set forth in claim 10 wherein the testing device is equipped with sensors, which monitor the deployment of the testing device and/or the failure of the testing device to properly deploy.

14. The method as set forth in claim 13 wherein the failure of the testing device and/or its system is differentiated from the failure of the interlock and/or its system.

15. The method as set forth in any of claims 1–3 or 5–9 or 11–14 in which the testing of the interlock and its system includes a system for bypassing the interlock function in order to test the interlock without disrupting the machine operation.

16. The method as set forth in claim 15 which includes a system for removing the bypass of the interlock function without disrupting the machine operation from any interlock and its system which has not been found defective by the interlock testing.

17. The method as set forth in claim 15 in which the system for bypassing the interlock function can maintain the interlock function of a failed interlock bypassed, in order not to disrupt the machine operation due to the presence of a defective interlock detected by the interlock testing.

18. The method as set forth in claim 15 in which the interlock function bypass can be removed by authorized personnel in order to perform maintenance, repair or replacement of the defective interlock and/or its system, or due to other requirements.

19. The method as set forth in claim 17 including visual or audible feedback systems and/or other indicators to inform users of the machine that an interlock is being bypassed for testing, tested, was or was not found to be defective, and of the status of the bypass after the testing.

20. The method as set forth in claim 19 that incorporate a system that will inform users of the machine of the location and status of every interlock.

21. The method as set forth in any of claims 1, 2, 5–9 or 11–14 in which testing of the interlock and its system includes a locking arrangement to lock the guard in order to prevent the opening of the guard during testing of the interlock.

22. The method as set forth in claim 21 in which the locking arrangement maintains the guard locked when the interlock testing detects an interlock fault, in order to prevent the opening of the guard with a faulty interlock.

23. The method as set forth in claim 22 in which the locking arrangement is equipped with sensors whose status determines and informs the system of the locking status of the locking device.

24. The method as set forth in claim 23 that incorporates a system that will inform users of the machine of the location and status of every locking device controlled by the interlock test system.

25. The method as set forth in claim 22 in which the locking device can be unlocked by authorized personnel in order to perform maintenance, repair or replacement of the faulty interlock or its system, or due to other requirements.

26. The method as set forth in claim 1 in which the guard and sensing system includes a light curtain and the state of the sensing system is changed by a test object penetrating the curtain.

27. The method as set forth in claim 1 in which the sensing system includes a magnetic field and the magnetic field is varied to test the functioning of the interlock and circuit system.

28. The method of testing a machine interlock system including a guard and an interlock mechanism capable of shutting down a power driven machine or changing its operating state or that of its system if the guard is opened comprising the steps of bypassing the interlock from the machine power or control circuit, permitting movement of the interlock mechanism relative to the guard and sensing such movement to test the functioning of the interlock system.

29. The method as set forth in claim 28 in which the movement of the interlock mechanism is permitted by the step of moving the guard away from the interlock mechanism.

30. The method as set forth in claim 28 in which the movement of the interlock mechanism is permitted by the step of moving the interlock mechanism away from the guard.

31. The method for testing a plurality of machine interlocks used in conjunction with guards by providing a control device and programming the operation of the control device to bypass each interlock and test the capability of each interlock to shut down the machine or to change the operating state of the machine or that of its system when it is bypassed.

32. The method as set forth in any of claims 1, 28 or 31 including the step of locking an individual guard in position when its respective interlock is bypassed during the testing operation to prevent said guard from being opened during testing.

33. The method as set forth in claim 32 including the step of retaining the guard in a locked condition if during testing it is determined that the interlock is malfunctioning or has malfunctioned.

34. The method as set forth in any of claims 28 or 33 including the step of keeping the interlock bypassed if it is determined that the interlock is malfunctioning or has malfunctioned.

35. The method set forth in claim 1 in which the guard is allowed to open only the amount necessary to permit testing of the interlock system but not an amount necessary to permit entry to cause injury to an operator.

36. The method for testing a plurality of machine interlocks and its circuit systems used in conjunction with guards by providing a control device and programming the operation of the control device to test the capability of each interlock and its system to shut down the machine or to change the operating state of the machine or that of its system when its respective guard is opened or breached.

37. The method as set forth in claim 36 in which the control device is additionally programmed to bypass each interlock and/or its circuit system when it is being tested to allow the machine to continue to run during the testing cycle.

38. Apparatus for testing interlocks and their circuit system used in conjunction with a guard arrangement, which interlocks are capable of functioning to shut down a machine power or control circuit or to change the operating state of the machine or that of its system consisting of an interlock mechanism positioned relative to a guard including a sensing system responsive to a change of state which when actuated will simulate opening of said guard, means for activating the sensing system, a control device programmed to bypass the interlock mechanism to prevent the power or control circuit from shutting down the machine or to change the operating state of the machine or that of its system when the interlock mechanism is tested and for sensing the activation of the sensing system to test the functioning of the interlock and its circuit system.

39. An apparatus in accordance with claim 38 in which the whole guard is an interlock, which when penetrated will simulate breaching of said guard, means for sensing the penetration of said guard, means for penetrating said guard to test the guard and its circuit system, and the means for activating the sensing system includes means for permitting activation of the penetration mechanism to test the guard, and a control device which is programmed to sense the penetration of the guard and the change of state of the sensing members to test the functioning of the interlock and its circuit system.

40. Apparatus in accordance with claim 39 in which the interlock system includes a light curtain as the guard and means are provided for penetrating the light curtain to simulate breaching of the guard and the control device is programmed to sense the breaching of the light curtain to test the functioning of the interlock and its circuit system.

41. Apparatus in accordance with claim 38 in which the sensing system includes a sensing member which when moved will simulate opening of said guard, the means for activating the sensing system includes means for permitting movement of the interlock mechanism relative to the guard and the control device is programmed to sense the movement of the sensing member to test the functioning of the interlock and its circuit system.

42. An interlock mechanism for shutting down a machine power or control circuit or to change the operating state of the machine or that of its system when a guard is opened that is capable of being tested whether or not the guard is opened during testing consisting of an interlocking sensor means adapted to be mounted on a machine in contact with a guard, and means for providing relative movement between the guard and the sensor means whether or not the guard is opened to test the operability of the sensor means.

43. An interlock mechanism as set forth in claim 42 in which the interlock mechanism includes a power driven pusher member positioned to engage said guard and means for resiliently mounting the pusher member and sensor means relative to the machine whereby if the guard does not open in response to the activation of said pusher member the resilient mounting of the interlock mechanism will permit movement of the interlock mechanism away from said guard to permit testing of the interlock mechanism.

44. An interlock mechanism in accordance with claim 43 which the resilient mounting means consists of a rubber like mounting pad interconnecting the interlock mechanism to the machine base.

45. An interlock mechanism in accordance with claim 43 in which the resilient mounting means consists of a pair of flat springs interconnecting the interlock mechanism to the machine.

46. An interlock mechanism in accordance with claim 42 comprising at least one power driven pusher member and the sensor means includes a magnetic relay with one magnetic element being connected to the guard, whereby when the guard is opened the magnetic field in the relay is varied to activate the interlock and the connection between said one magnetic element and the guard including a resilient member whereby upon actuation of the pusher member the magnetic field will be varied to permit testing of the interlock in the event the guard is stuck.

47. An interlock mechanism in accordance with claim 42 in which the sensor means comprises a switch member positioned to engage a guard and a solenoid operated toggle mechanism which has connected to it a plunger which is positioned to engage the guard, resilient means biasing the switch member and plunger into engagement with the guard whereby when the solenoid is actuated, the guard can be moved to the open position to permit movement of the switch member to test the interlock, and also having roller means engaging the machine for supporting the interlock and toggle actuated plunger relative to the guard so that in the event the guard is stuck, the interlock mechanism will move relative to the guard to permit the switch member to move to test the interlock.

48. An interlock mechanism in accordance with claim 42 including a solenoid operated plunger adapted to engage the guard to open same to permit testing of the interlock mechanism and further includes flat springs connecting the interlock mechanism relative to a machine so that in the event the guard does not open during extension of the plunger member the interlock mechanism will move relative to the guard to permit testing thereof.

49. An interlock mechanism in accordance with claim 42 in which the sensor means includes a switch that is in engagement with a guard and part of a machine power or control circuit so that when the guard is opened the machine will be shut off or change its operating state or that of its system, and an actuator assembly for moving the sensor away from the guard to permit testing of the interlock without opening the guard.

50. An interlock mechanism in accordance with claim 49 in which the actuator is of the linear type and includes an actuator rod to which an arm is connected at one end and the other end of the arm is connected to the interlock sensor means whereby linear movement of the actuator will move the interlock mechanism away from the guard to permit testing thereof.

51. An interlock mechanism as set forth in claim 42 in which the sensor means includes an actuator arm which is used both as an interlock and interlock testing member that is resiliently biased into a closed switch position in engagement with a guard and part of a machine power or control circuit so that when the guard is opened the switch is opened to turn off the machine, and a solenoid for testing the interlock function by moving the actuator arm away from the guard into a closed switch position of an interlock test switch to test the interlock without opening the guard.

52. An interlock mechanism which may be tested without opening the guard that is employed to prevent entrance to a hazardous space consisting of an interlock assembly disposed adjacent a guard, a headed plunger extending through the guard and spring-biased into engagement with the interlock assembly to maintain the interlock in condition to allow operation of the machine it is provided to protect and means for withdrawing the plunger to disengage it from the interlock or pushing the plunger to move the interlock sensor to simulate the interlock operation to thereby test the interlock without having to open the guard.

53. A combination guard interlock and guard locking mechanism consisting of an interlock positioned adjacent a guard, means for providing relative movement between the guard and interlock to permit testing of the interlock, means for testing the interlock, and means for locking the guard in position in the event the interlock has failed the tests.

54. A combination interlock and guard control mechanism consisting of an interlock positioned adjacent a machine guard and movable relative to the guard to permit testing thereof, means permitting limited partial opening of said guard to test said interlock, means for testing said interlock and means for preventing movement of the guard to the fully open position in the event the interlock does not function properly during testing.

55. A combination interlock and guard control mechanism as set forth in claim 54 in which the means permitting limited partial opening of said guard consists of a latch member secured to said guard that defines a slot and a retractable interference member that fits into said slot for controlling the opening movement of said guard.

56. A combination interlock and guard control mechanism as set forth in claim 54 in which the interference member is controlled by a solenoid mechanism and means interconnecting said solenoid mechanism and the means for testing said interlock whereby if the interlock has failed the tests the solenoid mechanism will lock the interference member in position to prevent movement of the guard to its full open position.

57. The method of testing a plurality of machine interlocks and their circuit systems used in conjunction with guards consisting of steps of individually bypassing each interlock and operating each interlock system to test the integrity of the interlock to ensure that when the guard it is protecting is opened or breached the interlock will turn off the machine or change its operating state or that of its system.

58. A method of testing an interlock of a machine positioned relative to a barrier guard comprising the step of changing the relationship of the interlock with respect to the barrier guard, sensing the state of the interlock, determining whether the interlock has failed to change from a first state to a second state, and generating an output signal in response to the determination that the interlock has failed to change states.

59. The method of claim 58 further comprising the steps of changing the interlock and guard to their original relationship, sensing the state of the interlock, and determining whether the state of the interlock has changed.

60. An apparatus for testing one or more interlocks of a machine that monitors one or more barrier guards comprising:

a processing unit in communication with this one or more interlocks, the processing unit adapted to sense the state of this one or more interlocks while the machine is operating, and also if not operating if so required, and to determine whether this one or more interlocks have failed to change states in response to the opening of the barrier guards; and an output device or an operator interface device, or both, coupled to the processing unit, wherein the device indicates whether this one or more interlocks have failed to change states.

61. The apparatus of claim 60 wherein the processing unit senses a change of one or more designated machine controlling parameters.

62. The apparatus of claim 60 wherein the processing unit senses a change of a n electrical parameter of the interlock.

63. The apparatus of claim 60 wherein the interlock includes a switch and wherein the processing unit senses the opening of the switch, the closing of the switch, and breaching of a light curtain guard.

64. The combination guard interlock, interlock testing mechanism and guard locking mechanism consisting of an interlock positioned adjacent a guard, first means for providing relative movement between the guard and interlock to permit testing of the interlock, second means for testing the interlock, and third means responsive to the means providing relative movement between the guard and interlock to lock the guard in position during the testing phase, and subsequently if a faulty interlock is detected by the testing, to prevent opening of the guard.

65. A combination guard interlock and guard locking mechanism in accordance with claim 64 in which the interlock includes a sensor means that includes a switch in engagement with a guard, second means includes an actuator assembly for moving the sensor away from the guard, and said third means comprises a latch member positioned by said actuator assembly to lock said guard to prevent the guard from being opened during testing.

66. A combination guard interlock and guard locking mechanism in accordance with claim 65 in which the latch member is slidably mounted and said third means includes a pivotally mounted crank arm connecting said actuator to said latch member whereby movement of said crank arm by said actuator moves the latch member into and out of engagement with said guard.

* * * * *